(12) United States Patent
Kane et al.

(10) Patent No.: US 6,397,653 B1
(45) Date of Patent: Jun. 4, 2002

(54) FOLDED METAL BELLOWS

(75) Inventors: Nathan R. Kane, Somerville, MA (US); Brian R. Tranter, High Wycombe (GB)

(73) Assignee: PerkinElmer, Inc., Wellesley, MA (US)

( * ) Notice: Subject to any disclaimer, the term of this patent is extended or adjusted under 35 U.S.C. 154(b) by 0 days.

(21) Appl. No.: 09/374,915

(22) Filed: Aug. 13, 1999

Related U.S. Application Data

(63) Continuation-in-part of application No. 08/798,064, filed on Feb. 11, 1997, now Pat. No. 6,054,194.

(51) Int. Cl.⁷ ............................................. B21C 37/30
(52) U.S. Cl. .................. 72/370.23; 72/299; 72/370.01; 72/370.19; 72/371
(58) Field of Search ........................ 72/370.01, 370.19, 72/370.2, 370.23, 370.26, 371, 299, 113, 367.1

(56) References Cited

U.S. PATENT DOCUMENTS

| | | | | |
|---|---|---|---|---|
| 3,467,042 A | * | 9/1969 | Coppa | 72/370.19 |
| 3,606,780 A | * | 9/1971 | Nagahara | 72/370.01 |
| 3,878,707 A | * | 4/1975 | Thompson | 72/370.19 |
| 3,967,023 A | | 6/1976 | Lysek | |
| 4,171,634 A | * | 10/1979 | Perkins | 72/371 |
| 5,008,140 A | | 4/1991 | Schmertz | |
| 5,058,409 A | * | 10/1991 | Washizu | 72/370.19 |
| 5,234,727 A | | 8/1993 | Hoberman | |
| 5,471,934 A | | 12/1995 | Koch | |
| 5,771,726 A | * | 6/1998 | Bibby et al. | 72/299 |
| 5,799,699 A | | 9/1998 | Chiang | |

OTHER PUBLICATIONS

Annenberg et al., "Materials for Bellows Type Protective Devices", Machines & Tooling, v. 33, No. 11, 1962, pp. 39–42.

"Thermic–Weld Covers", Copyright 1991, Milwaukee Protective Covers, pp. 2, 5 and 6, Catalog No. PC 9102.

"Gortite Linear Rail Covers", Copyright 1993, A&A Mfg. Co., Inc., Bulletin No. LAC–100.

"Protect & Hema Laminated Bellows", Protect & Hema, L.L.C., pp. 15, 17–19.

"Centryco Bellows Selection and Design Guide", Centryco.

* cited by examiner

*Primary Examiner*—Ed Tolan
(74) *Attorney, Agent, or Firm*—Iandiorio & Teska

(57) ABSTRACT

A method of making a folded metal bellows wherein an n-sided mandrel is positioned within a metal tube at an initial position. A convolution is formed by: axially moving and turning the mandrel with respect to and within the tube from the initial position to a second position. The mandrel is then fixed to the tube and driven towards the initial position while turning the mandrel (and the tube).

19 Claims, 28 Drawing Sheets

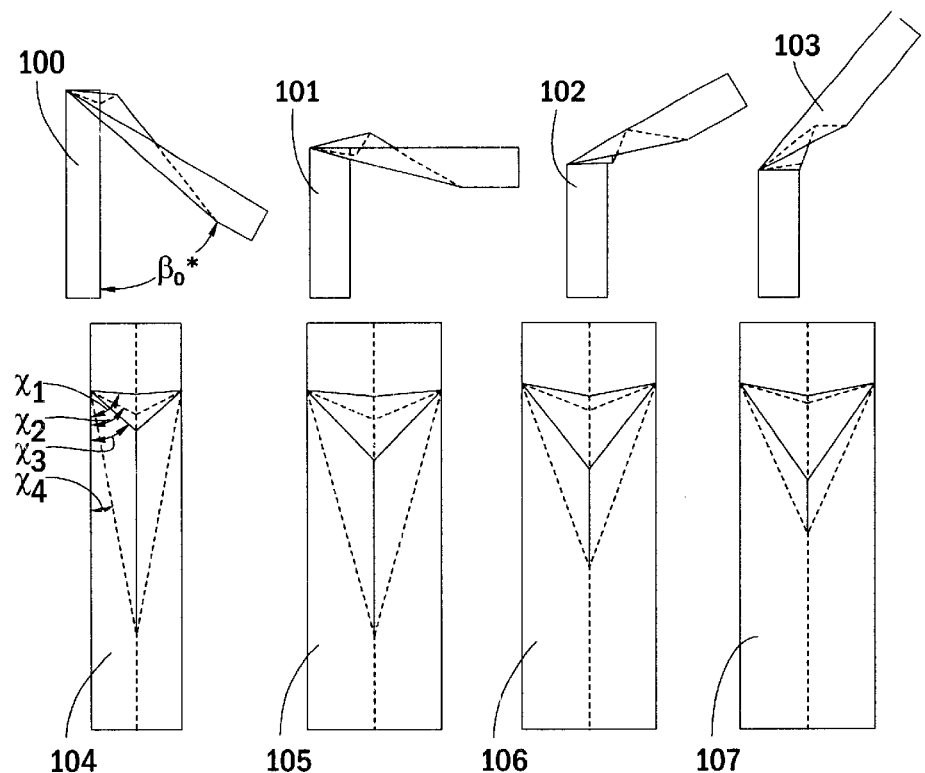
FIG. 11.
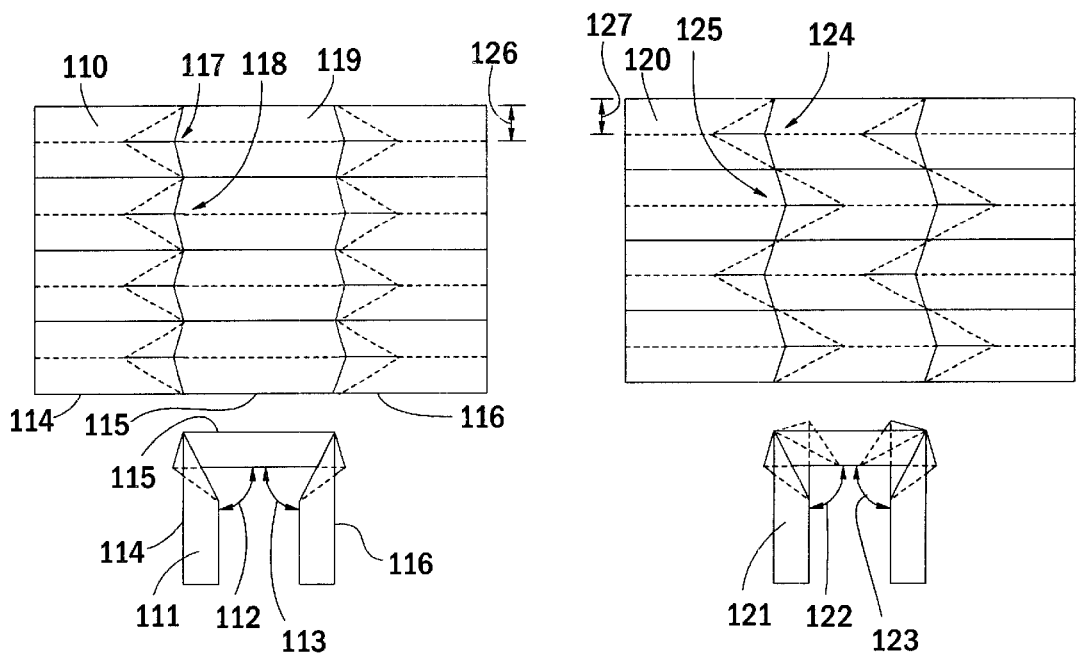
FIG. 12.
FIG. 13.

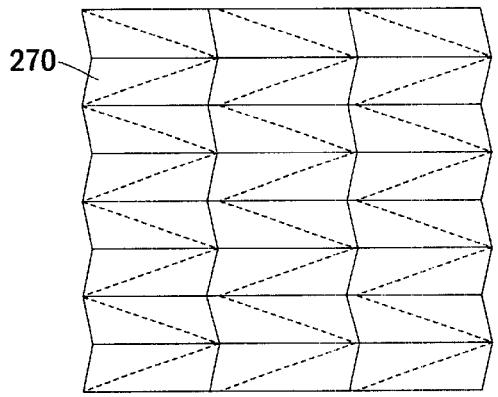
FIG. 26.
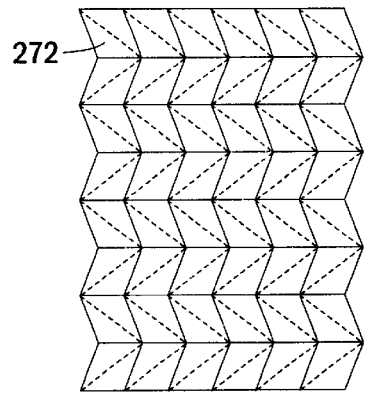
FIG. 27.
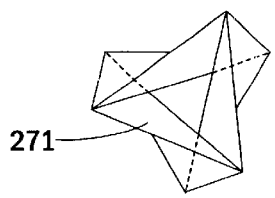
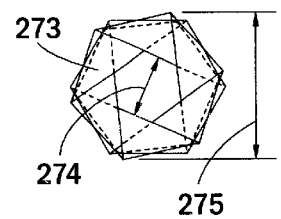
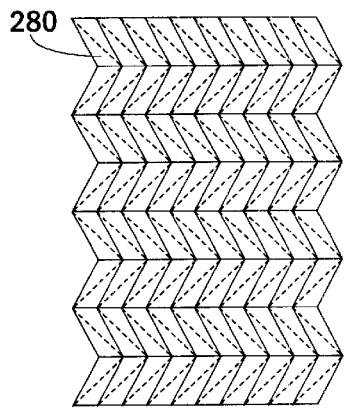
FIG. 28.
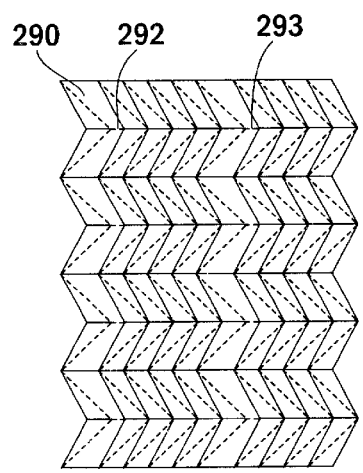
FIG. 29.
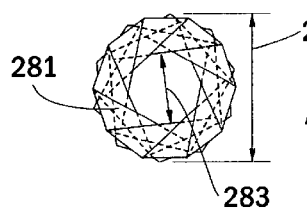
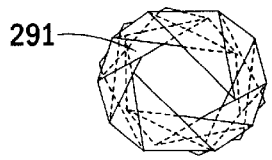

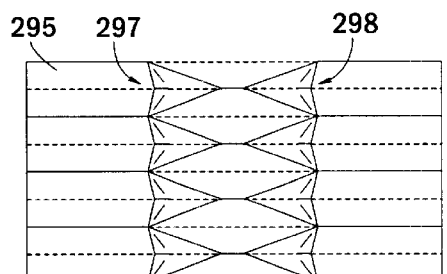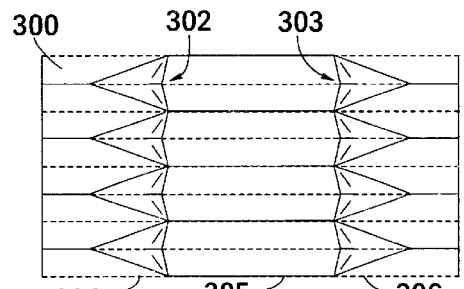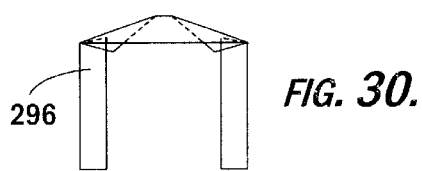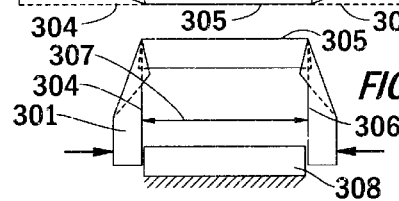
FIG. 30.  FIG. 31.
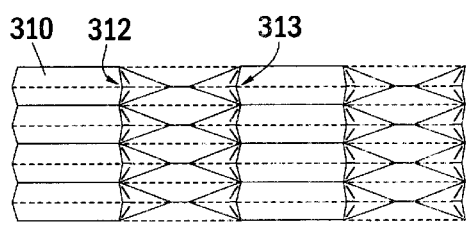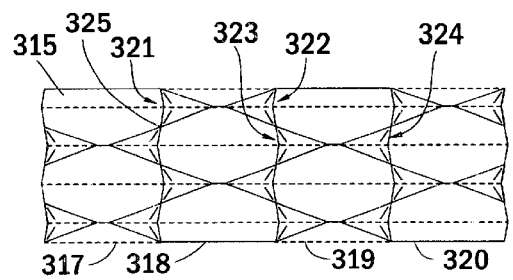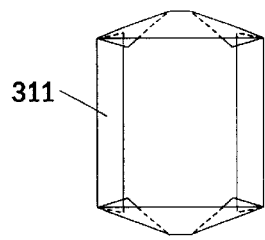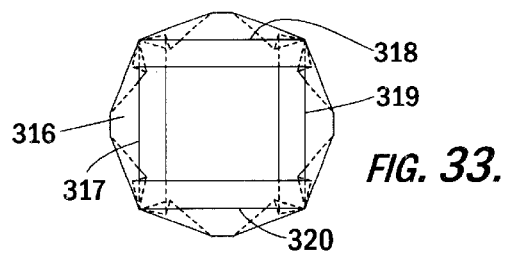
FIG. 32.  FIG. 33.
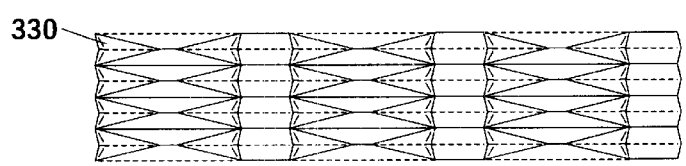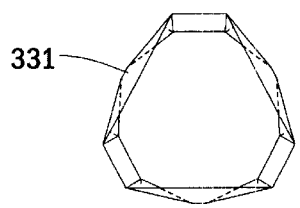
FIG. 34.

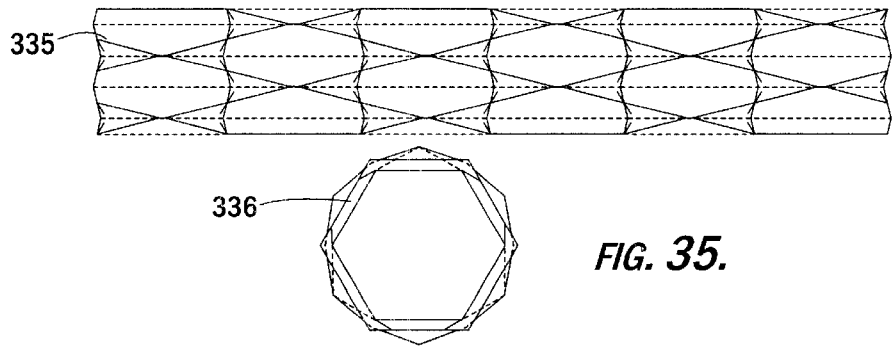
FIG. 35.
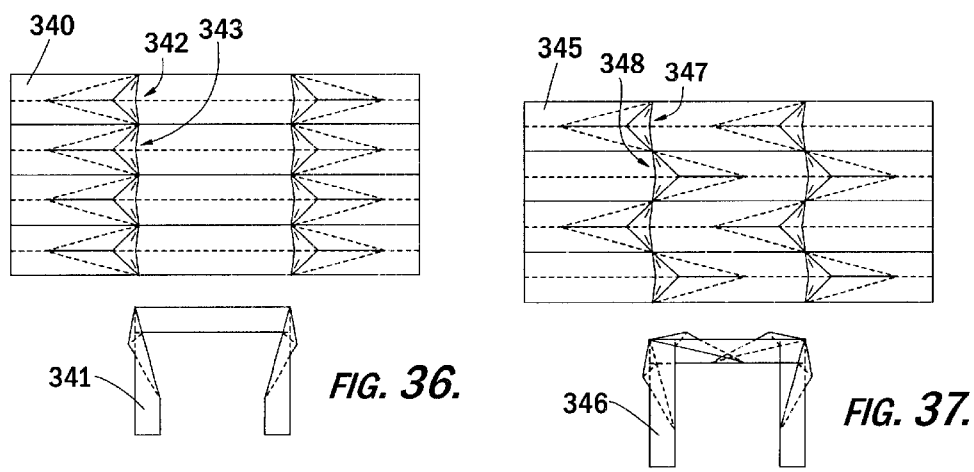
FIG. 36.
FIG. 37.
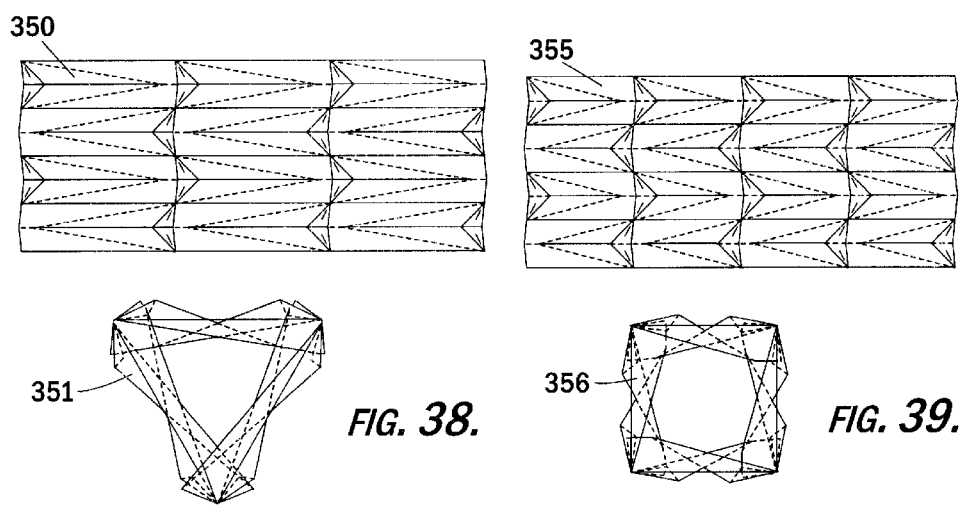
FIG. 38.
FIG. 39.

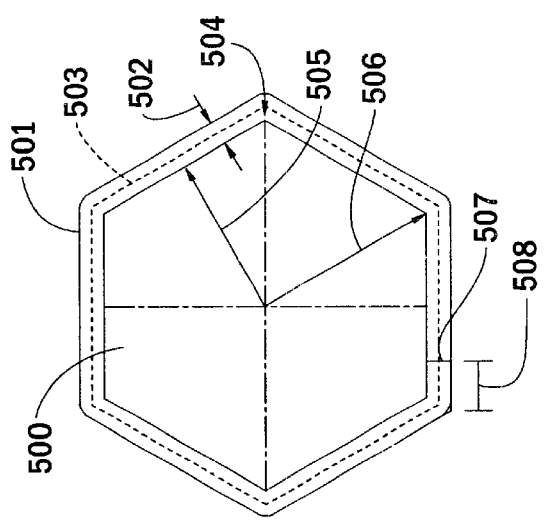
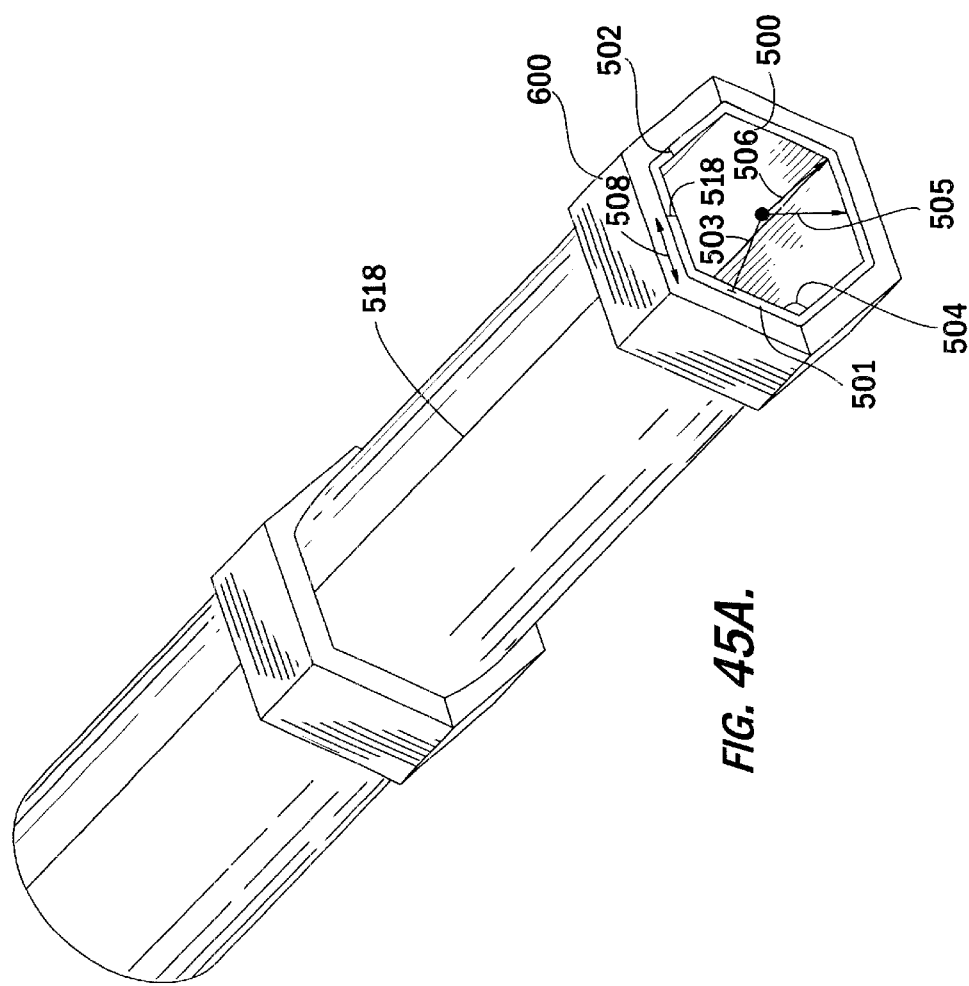

FOLDED METAL BELLOWS

RELATED APPLICATIONS

This application is a continuation-in-part of U.S. Pat. No. 08/798,064 filed on Feb. 11, 1997 now U.S. Pat. No. 6,054,194.

FIELD OF THE INVENTION

This invention relates to a method of making a folded metal bellows.

BACKGROUND OF THE INVENTION

Bellows of various types are used in a wide variety of industrial machines and products. Bellows which have a closed cross section are used for a variety of applications such as protecting shock absorbers, lead screws, hydraulic rods, and various other machine parts from contaminants, and for conveying or pumping gases or fluids. Some designs are also used as flexible seals for gasses and liquids. Bellows which have an open cross section are commonly used for protecting linear ways in machine tools and similar components of industrial machinery. Prior art bellows designs can be classified into three categories: the folded bellows, which is made by forming discrete fold lines into a tube or sheet of foldable material; the corrugated bellows, which is made by permanently stretching the material significantly to form an undulating surface onto a tube or a sheet; and the layered bellows, which is made by selectively joining the edges of a stack of sheets or plates.

Folded bellows designs, to which the present invention specifically relates, are used widely in industry because they have a high extended length to compressed length ratio, and they are relatively easy to custom fabricate. Prior art fold patterns which are used for folded bellows by companies today are very traditional and have been used for centuries. A useful reference which shows the two main traditional prior art fold patterns is "Materials for Bellows Type Protective Devices" by E. A. Annenberg, E. A. Maiorova, I. M. Sokhor, in *Machines and Tooling*, v 33, n 11, 1962 p. 39–42. In that reference, FIG. 2 and FIG. 3 show two classic fold patterns used for forming the corners of bellows. For the sake of discussion, these fold patterns, which form the corner of a bellows, will be given names. In FIG. 3 of Annenberg et. al, each V-shaped fold pattern, which forms the corner of a bellows, will be referred to as a single inversion. In FIG. 2 of Annenberg et. al, each V-shaped fold pattern that has an additional fold connecting the wings of the V will be referred to as a classic double inversion. Single inversions and classic double inversions are widely used to form the corners of bellows in industry. Also in Annenberg et. al, FIG. 4 shows an unusual double inversion pattern which is particularly used for a hexagonal closed cross section bellows, proposed by the Russian designer Pavchinskii. Since the Pavchinskii design cannot have an arbitrary cross section, it is not used in industry.

A deficiency of single inversions and classic double inversions commonly used in industry are that when they are extended, they impose outward tilting, or inward tilting, respectively, on the bellows walls. To prevent this undesirable wall tilting when the bellows is extended, shape holding frames are used which are sewn in between adjacent folds, and floppy rubberized fabrics are used to allow the fold lines to undergo gross distortions. Using either single inversions or classic double inversions, the design paradigm has been to use shape holding frames to provide the structural rigidity, and floppy rubberized fabrics to allow gross distortions of the bellows fold lines when the bellows is extended. This prior art design paradigm means that an expensive multi-step assembly process must be used to make the bellows and expensive rubberized fabrics must be used for the folded material.

As stated earlier, all major bellows manufacturers which make protective covers use either single inversions or classic double inversions to form the corners of bellows. As a result, bellows manufacturers of today are forced to use the costly design paradigm for bellows discussed earlier. For example, in the Design Handbook provided by Milwaukee Protective Covers—P.E.I., Milwaukee, Wis., several way cover bellows are shown which use a classic double inversion to form the bellows corners. Page 5 of the handbook shows several PVC stiffening panels which are welded between each fold of a special flexible material. In the Product Guide supplied by Protect & Hema, L.L.C., Loves Park, Ill., on page 15 is shown the underside of a bellows that uses a classic double inversion, which has a complex assembly of stiffening panels and straps to prevent the bellows from overextending. These extra parts are needed because the folded material itself is too floppy to give the bellows support. On pages 17 and 18 are shown bellows that use single inversions to form the bellows corners and plastic stiffening panels glued underneath each bellows panel. In another example, a product flyer provided by A&A Mfg. Co., Inc. of New Berlin, Wis. entitled "Gortite® Linear Rail Covers" shows several way covers which use classic double inversions to form the bellows corners with stiffening panels at each fold. Another manufacturer, Centryco® of Burlington N.J., in their flyer entitled "Centryco Bellows Selection & Design Guide" shows some closed cross section bellows which use classic double inversions to form the bellows corners with stiffening panels sewn in at each fold.

Another relevant area of prior art is passage protection devices for articulated buses or trains. In U.S. Pat. No. 5,471,934, a novel tongue and groove fold is shown to form the corner of a bellows which can provide long extension lengths. While the geometry of this fold is different than either the single inversion or the classic double inversion, it still requires a flexible fabric to be used, and stiffening frames to be attached on either side of the fold. Therefore, this fold does not change the design paradigm described for bellows and hence is costly and complex.

SUMMARY OF THE INVENTION

An object of the present invention, accordingly, is to provide an improved family of fold patterns for forming the corner of a bellows which when folded into a stiff but foldable material, for which the folds act like hinges and the bellows panels remain rigid, can be designed using a mathematical model to provide minimal tilting of bellows walls over a specified extension angle range, thus allowing, unlike all other prior art folds, a structurally stiff, long extending bellows which holds its own shape to be made from a single sheet of stiff but foldable material.

A further object is to provide an improved family of fold patterns for forming the corner of a bellows which can be designed using a mathematical model to provide exactly zero tilting of the bellows walls at one or more non-zero extension lengths specified by a designer, thus allowing, unlike all other prior art folds, a structurally stiff, long extending bellows to be formed in an extended state using fast production techniques such as vacuum forming, blow molding, or injection molding, while also allowing the bellows to be free of distortion in the compressed state.

A further object is to provide an improved family of fold patterns which when incorporated into a bellows that does have shape holding frames, greatly reduces the material stress and distortion along the fold lines when the bellows is extended, thereby allowing the bellows to be compressed and extended with less force, allowing longer extension lengths, longer fatigue life, and allowing a designer to use a greater variety of stiff but foldable materials for bellows designs, as opposed to prior art folds which restrict a designer to using only floppy materials such as fabrics and rubber sheets.

A further object is to provide an improved family of fold patterns for forming the corner of a bellows which when properly designed and optimized using a mathematical model, can provide a bellows with two or more elastically stable states; the first state being near full collapse, and the other states being near full extension, thereby providing a novel collapsible, expandable conduit or container.

A further object of this invention is to provide a method of making a folded metal bellows.

A further object of this invention is to provide such a method which is less labor intensive than the manufacture of welded bellows.

A further object of this invention is to provide a folded metal bellows—a structure not before manufactured.

This invention results from the realization that a metal bellows can be more easily and thus more economically manufactured not by welding or forming techniques but instead by folding the bellows and optimizing the inversion design angles based on the maximum allowable change in extension angle using a pair of n-sided mandrels inside a metal tube to be formed into an n-sided bellows and axially moving and rotating one mandrel with respect to the other by predetermined distances and angles such that the edges of the mandrel crease the metal bellows in a predetermined way to thus form convolutions.

This invention features a method of making a folded metal bellows wherein an n-sided mandrel is positioned within a metal tube at an initial position and convolutions are formed by: 1) axially moving and turning the mandrel with respect to and within the tube from the initial position to a second position, and 2) fixing the mandrel with respect to the tube and driving the mandrel back towards the initial position while again turning the mandrel with respect to the tube. In step 1), the mandrel forms creases in the tube and in step 2) the tube is folded along the creases forming a convolution.

Further included may be the step of forming additional :convolutions by positioning the n-sided mandrel at a new initial position (e.g., the second position) within and with respect to the metal tube and repeating steps 1) and 2). When additional convolutions are formed, a second n-sided mandrel may be used and placed within the metal tube such that the convolutions are located between the second n-sided mandrel and the first n-sided mandrel. A portion of the tube beyond (e.g. above) the convolutions and the first mandrel should be fixed with respect to the second n-sided mandrel to prevent movement of convolutions during movement of the first n-sided mandrel. The number of sides (n) of the mandrel may be between four and nine.

The first n-sided mandrel is preferably turned with respect to the tube in the same direction on both the upward stroke and the downward stroke but then the turning direction reversed after forming a predetermined number convolutions to eliminate twisting of the bellows under compression.

The invention also features a folded metal bellows made by this method. In the preferred embodiment, the method of making a folded metal bellows out of a round tube in accordance with this invention comprises: choosing first and second inversion design angles $X_1$ and X2 based on the function:

$$0 = 2\pi/n_s - 2\tan^{-1}(\cos(1.2\,\Delta\alpha_{max}/2)\tan(\pi/n_s + \chi_2)) + 2\tan^{-1}(\cos(1.2\,\Delta\alpha_{max}/2)\tan(\chi_2))$$

where $\Delta\alpha_{max}$ is the maximum allowable change in the extension angle and $\eta_s$ is the number of sides of the bellows and $$x_1 = \frac{\pi}{n_s} + x_2.$$

This invention also features a folded metal bellows made by this method. More broadly, in contrast to welded metal bellows, the method of this invention includes the steps of forming creases in a round tube and compressing the tube such that the tube material folds along the creases to form convolutions along the creases The method of making a folded metal bellows, also comprises positioning an n-sided mandrel within a metal tube at an initial position; and forming a convolution by: 1) axially moving and turning the mandrel with respect to the tube from the initial position to a second position to form creases in the tube, and 2) axially moving and turning the tube to fold the tube along the creases. The mandrel may itself be moved and rotated or a second mandrel, fixed with respect to the tube may be rotated as the first mandrel is moved axially within the tube. Preferably, the first mandrel is fixed with respect to the tube during step 2 and it is the mandrel which is axially moved and turned and brought back proximate its original position to fold the tube along the creases.

BRIEF DESCRIPTION OF THE DRAWINGS

The present invention will now be described with reference to the accompanying drawing in which:

FIG. 11 shows scale drawings of some quadruple inversions optimized to have minimal distortion up to an extension limit of 120 degrees;

FIG. 12 shows an open cross section bellows using double inversions that have a 90 degree initial wall angle;

FIG. 13 shows a bellows derived from FIG. 12 which has alternating double inversions;

FIG. 26 shows a bellows with a triangular cross section that has all triangular panels;

FIG. 27 shows a bellows with a hexagonal cross section that has all triangular panels;

FIG. 28 shows a bellows with a uniform ten sided closed cross section that has all triangular panels;

FIG. 29 shows a bellows with non uniform ten sided closed cross section that has almost all triangular panels;

FIG. 30 shows an open cross section bellows using inward pointing triple inversions that have a 90 degree initial wall angle;

FIG. 31 shows an open cross section bellows using outward pointing triple inversions that have a 90 degree initial wall angle;

FIG. 32 shows a bellows with a rectangular cross section using triple inversions;

FIG. 33 shows a bellows derived from FIG. 32 with alternating triple inversions;

FIG. 34 shows a bellows with a non uniform six sided cross section using triple inversions;

FIG. 35 shows a bellows derived from FIG. 34 which uses alternating triple inversions;

FIG. 36 shows an open cross section bellows using quadruple inversions that have a 90 degree initial wall angle;

FIG. 37 shows a bellows derived from FIG. 36 which uses alternating quadruple inversions;

FIG. 38 shows a bellows with a triangular cross section that uses quadruple inversions;

FIG. 39 shows a bellows with a square cross section that uses quadruple inversions;

FIG. 45A is a schematic view of a mandrel placed inside a metal tube in order to form a folded metal bellows in accordance with the subject invention;

FIG. 45B is an end view of the assembly shown in FIG. 45A;

DESCRIPTION OF THE PREFERRED EMBODIMENTS OF THE INVENTION

This invention achieves its objectives by incorporating two or more single inversion fold patterns connected in series whose design angles are mathematically computed to minimize tilting of the bellows walls when the bellows is extended. It will be shown that a classic double inversion fold pattern is a special case of a more general double inversion fold pattern which will be presented here. Among other things, the analysis will show that an optimized double inversion fold pattern of the present invention can impose an order of magnitude less tilting of the bellows walls than a classic double inversion imposes. Furthermore, by adding a third single inversion to the series, the wall tilting can be reduced by another factor of 10. The theory is generalized so that wall tilt can be minimized given any number of single inversions connected in series.

It should be noted that the concepts of a single inversion, a classic double inversion, an optimized double inversion, and an "n" inversion fold pattern were created by the inventor to make explaining this invention easier, so the reader can absorb the present invention quickly and easily. After I present these concepts, the idea of putting multiple single inversions in series to minimize wall tilt may seem obvious to the reader, but since people skilled in the art of bellows manufacturing do have these concepts, and these concepts do not exist anywhere in known literature, the invention presented here would be far from obvious to them before reading the explanation presented here.

Figure 1:
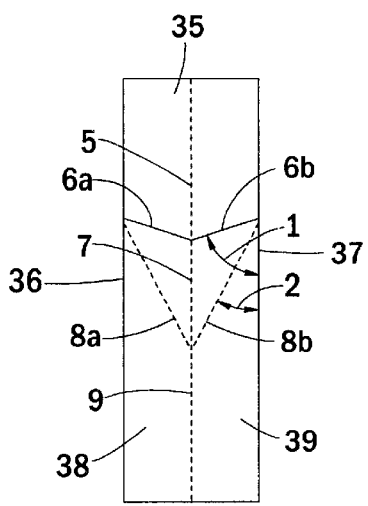
FIG. 1 is a plan view of a general double inversion fold pattern.
Figure 2:
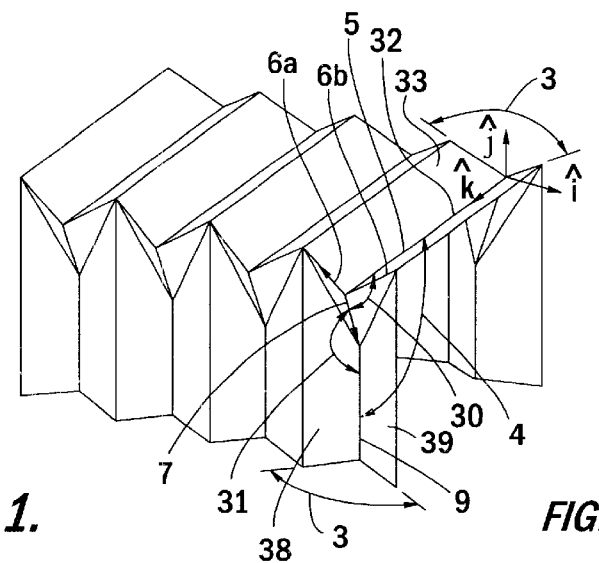
FIG. 2 is an isometric view of a bellows which uses several double inversion fold patterns.

In FIG. 1 in a flattened view, or plan view, a generalized double inversion fold pattern is shown drawn on foldable sheet of material 35. In plan view in FIG. 1, all dashed lines drawn on sheet 35 represent inner folds (which create valleys when folded), and all solid lines drawn on sheet 35 represent outer folds (which create peaks when folded). FIG. 2 shows and isometric view of a bellows which uses a plurality of general double inversion fold patterns like the one shown in FIG. 1. A general double inversion fold pattern, which forms a corner of a bellows, consists of a series of two single inversion fold patterns, the first single inversion fold pattern consisting of longitudinal inner fold 5, diagonal outer fold 6a, diagonal outer fold 6b, and longitudinal outer fold 7. The diagonal folds 6a and 6b are mirror images of each other about longitudinal fold lines 5 and 7. The edges 36 and 37 of sheet 35 are equally spaced from and parallel to the longitudinal fold lines 5, 7 and 9. When a plurality of double inversions are used in a bellows, the edges 36 and 37 become outer folds. The first single inversion is characterized by arbitrary design angle 1, which makes an angle between longitudinal edge 37 and diagonal fold 6b. The second single inversion fold pattern consists of longitudinal outer fold 7, diagonal inner fold 8a, diagonal inner fold 8b, and longitudinal inner fold 9. Like the first single inversion, the diagonal folds 8a and 8b are mirror images of each other about longitudinal fold lines 7 and 9. The second single inversion is characterized by arbitrary design angle 2, which makes an angle between longitudinal edge 37 and diagonal fold 8b. When a double inversion is partially folded as shown in FIG. 2, so that bellows panels 38 and 39 make extension angle 3 between them, longitudinal fold lines 5 and 9 make wall angle 4 between them. As will be shown via analysis, when extension angle 3 changes, the wall angle 4 changes as well, assuming all folds act as ideal hinges and the bellows panels remain rigid. The mathematical relationship between the extension angle 3 and the wall angle 4 entirely depends on the values that are assigned to design angles 1 and 2.

When design angle 1 is set to 90 degrees, the general double inversion shown in FIG. 1 becomes a classic double inversion commonly used in industry. When design angle 2 is set to zero degrees, fold line 7 becomes infinitely long, and the general double inversion degenerates to a single inversion commonly used in industry. As will be shown for the present invention, design angles 1 and 2 can be set to novel values which make the change in wall angle 4 about ten times smaller than what the prior art folds give over a specified range of extension angle 3. It will also be shown that design angles 1 and 2 can be set to novel values which make wall angle 4 decrease slightly and then return to the initial wall angle at a non zero extension angle, thus allowing, unlike all other prior art folds, a stiff bellows to be formed in an extended state using fast production techniques such as vacuum forming, blow molding, or injection molding. Also, a closed cross section bellows can be made elastically stable at the non zero extension angle which gives zero wall tilting, making the bellows useful for collapsible containers and extendible structures.

Figure 3:
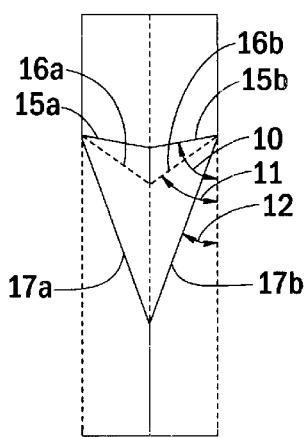
FIG. 3 is a plan view of a general triple inversion fold pattern.
Figure 4:
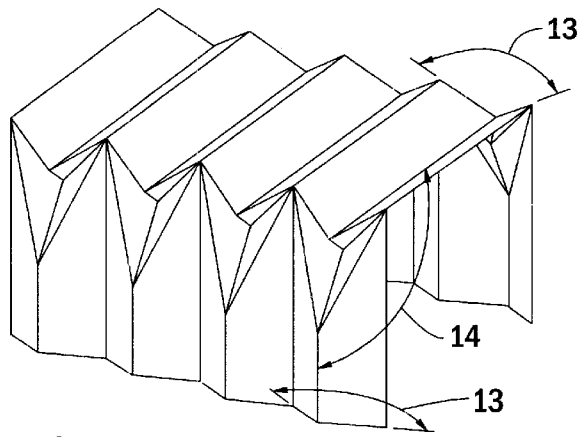
FIG. 4 is an isometric view of a bellows which uses several triple inversion fold patterns.

In FIG. 3 in a plan view, a general triple inversion which forms the corner of a bellows is shown. A general triple inversion consists of a series of three single inversion fold patterns. The general triple inversion, like the general double inversion, is a novel mathematical construction which can represent both prior art fold patterns and fold patterns of the present invention. In FIG. 3, the first inversion includes outer diagonal folds 15a and 15b, the second inversion includes inner diagonal folds 16a and 16b, and the third inversion includes outer diagonal folds 17a and 17b. In FIG. 4 is shown an isometric view of an open cross section bellows which uses the general triple inversion. For the general triple inversion, the design angle 10 associated with the first inversion, the design angle 11 associated with the second inversion, and the design angle 12 associated with the third inversion together dictate the mathematical relationship between extension angle 13 and wall angle 14.

Although the triple inversion is more complex than the double inversion, the third design angle gives a designer more control over how the wall angle changes with the extension angle. For example, if a designer wishes to minimize the change in wall angle, a triple inversion can give a change that is about ten times smaller than what a double inversion can give (or about one hundred times less than what prior art folds give) over a specified extension angle range. Also, if a designer wishes to create an elastically bi-stable bellows, the designer can customize how the wall angle changes with extension angle more exactly than is possible using a double inversion.

Figure 5:
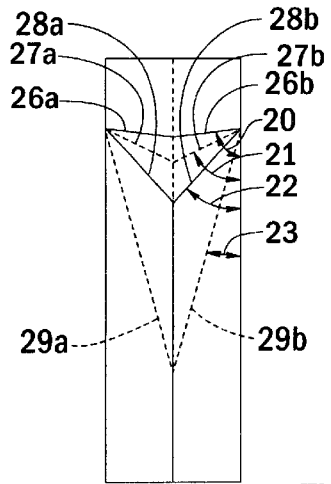
FIG. 5 is a plan view of a general quadruple inversion fold pattern.
Figure 6:
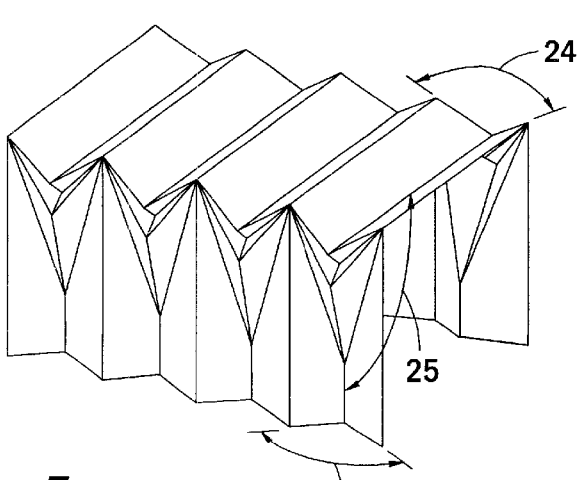
FIG. 6 is an isometric view of a bellows which uses several quadruple inversion fold patterns.

In FIG. 5 in a folded flat view, a general quadruple inversion which forms the corner of a bellows is shown. A general quadruple inversion consists of a series of four single inversion fold patterns. In FIG. 5, the first inversion includes outer diagonal folds 26a and 26b, the second inversion includes inner diagonal folds 27a and 27b, the third inversion includes outer diagonal folds 28a and 28b, and the fourth inversion includes inner diagonal folds 29a and 29b. In FIG. 6 is shown an isometric view of an open cross section bellows which uses the general quadruple inversion. For the general quadruple inversion, the design angle 20 associated with the first inversion, the design angle 21 associated with the second inversion, the design angle 22 associated with the third inversion, and the design angle 23 associated with the fourth inversion together dictate the functional relationship between the extension angle 24 and the wall angle 25.

Although the quadruple inversion is more complex than the triple inversion, the fourth design angle gives a designer even more control over how the wall angle changes with the extension angle. If a designer wishes to minimize the change in wall angle, a quadruple inversion can give a change that is about ten times smaller than what a triple inversion can give (or about one thousand times less than what prior art folds give) over a specified extension angle range. Also, if a designer wishes to create an elastically bi-stable bellows, the designer can customize how the wall angle changes with extension angle more exactly than is possible using a triple inversion.

The mathematical relationship between the wall angle and the extension angle for an "n" inversion fold is now derived for the present invention. To begin the analysis, a single inversion is analyzed, and then several inversions are connected in series. As mentioned previously, the mathematical relationship is derived assuming the fold lines act as ideal hinges and the bellows panels remain perfectly rigid.

Given a single inversion such as 6a with its mirror image 6b, characterized by the design angle 1, the wall angle 30 verses the extension angle 3 is derived via vector trigonometry. Establishing the $\hat{i},\hat{j},\hat{k}$ coordinate system in FIG. 2 such that the $\hat{j}$-$\hat{k}$ plane bisects bellows panels 32 and 33, the vectors $\overline{V}1$ and $\overline{V}2$, lying along fold lines 6a and 7, respectively, are expressed as $$\overline{V}1 = -\sin(\alpha/2)\sin(\chi 1)\hat{i} + \cos(\alpha/2)\sin(\chi 1)\hat{j} - \cos(\chi 1)\hat{k} \quad (1)$$

$$\overline{V}2 = -\sin(\beta_1)\hat{j} - \cos(\chi_1)\hat{k} \quad (2)$$

where $\chi 1$ represents design angle 1, $\beta 1$ represents wall angle 30, and $\alpha$ represents extension angle 3. Assuming no deformation of the bellows panels, the angle between vectors $\overline{V}1$ and $\alpha V2$ must remain constant at 180-$\chi 1$. This constraint is imposed by Equation (3).

$$\overline{V}_1 \cdot \overline{V}_2 = |\overline{V}_1||\overline{V}_2|\cos(180-\chi_1) \quad (3)$$

After substituting Equations (1) and (2) into Equation (3), performing the dot product, and applying some trigonometric identities, the wall angle $\beta 1$ is expressed in radians as $$\beta_1 = \pi - 2\tan^{-1}(\cos(\alpha/2)\tan(\chi_1)) \quad (4)$$

where $\chi 1$ is the design angle 1, and $\alpha$ is extension angle 3.

Generalizing Equation (4), the wall angle $\beta^i$ associated with inversion "i" is given by $$\beta_i = \pi - 2\tan^{-1}(\cos(\alpha/2)\tan(\chi_i)) \quad (5)$$

where $\chi^i$ is design angle "i", and $\alpha$ is the extension angle 3.

Using Equation (5), the wall angle verses extension angle imposed by an "n" inversion fold pattern of the present invention can be systematically derived.

For the general double inversion, the wall angle 4, represented by $2\beta^*$, is given by $$2\beta^* = \beta_1 + (\pi - \beta_2) \quad (6)$$

$$2\beta^* = \pi - 2\tan^{-1}(\cos((\alpha/2)\tan(\chi_1)) + 2\tan^{-1}(\cos((\alpha/2)\tan(\chi_2)) \quad (7)$$

where $\chi_1$ and $\chi 2$ represent design angles 1 and 2, respectively, $\beta_1$ represents wall angle 30, $\beta_2$ represents wall angle 31, and $\alpha$ represents extension angle 3.

For the general triple inversion, wall angle 14, represented by $3\beta^*$, is given by $$3\beta^* = \beta_1 + (\pi - \beta_2) - (\pi - \beta_3) \quad (8)$$

$$3\beta^* = \pi - 2\tan^{-1}(\cos(\alpha/2)\tan(\chi_1)) + 2\tan^{-1}(\cos(\alpha/2)\tan(\chi_2)) - 2\tan^{-1}(\cos(\alpha/2)\tan(\chi_3)) \quad (9)$$

where $\chi_1$, $\chi_2$, and $\chi_3$ represent the design angles 10, 11, and 12, respectively, and $\alpha$ represents extension angle 13.

For the general quadruple inversion, the wall angle 25, represented by $4\alpha^*$, is given by $$4\beta^* = \beta_1 + (\pi - \beta_2) - (\pi - \beta_3) + (\pi - \beta_4) \quad (10)$$

$$4\beta^* = \pi - 2\tan^{-1}(\cos(\alpha/2)\tan(\chi_1)) + 2\tan^{-1}(\cos(\alpha/2)\tan(\chi_2)) - 2\tan^{-1}(\cos(\alpha/2)\tan(\chi_3)) + 2\tan^{-1}(\cos(\alpha/2)\tan(\chi_4)) \quad (11)$$

where $\chi 1, \chi 2, \chi 3$, and $\chi 4$ represent design angles 20, 21, 22, and 23, respectively, and $\alpha$ represents extension angle 24.

For an "n" inversion fold pattern, $n\beta^*$ is given by $$n\beta^* = \pi + 2\sum_{i=1}^{n}\tan^{-1}(\cos(\alpha/2)\tan(\chi_i))\cdot(-1)^i \quad (12)$$

In most cases, a designer will specify an initial wall angle $\beta\alpha 1^*$ that a fold pattern should have at some initial extension angle $\alpha_1$. Given $\alpha_1$ and $\beta\alpha 1^*$ for an "n" inversion fold pattern, one design angle can be eliminated from Equation (12), leaving n-1 design angles to be manipulated freely by a designer to customize how wall angle $n\beta^*$ changes with extension angle $\alpha$. By making the substitutions $\alpha = \alpha_1$ and $n\beta^* = \beta 1^*$ into Equation (12), the design angle $\chi 1$ is eliminated.

$$\chi_1 = \tan^{-1}\left\{\frac{\tan\left(\frac{\pi - \beta^*_{\alpha 1}}{2} + \sum_{i=2}^{n}\tan^{-1}(\cos(\alpha_1/2)\tan(\chi_i))(-1)^i\right)}{\cos(\alpha_1/2)}\right\} \quad (13)$$

For the common case when a designer specifies an initial wall angle $\beta o^*$ at a zero initial extension angle $\alpha_1 = 0$, Equation (13) simplifies to $$\chi_1 = \frac{\pi - \beta^*_o}{2} + \sum_{i=2}^{n}\chi_i(-1)^i \quad (14)$$

Equation (12), used with Equation (13), is an extremely powerful and general equation. For any number of inversions, a designer can specify any initial wall angle $\beta\alpha 1^*$ at any $\alpha_1$, and then customize how the wall angle $n\beta^*$ varies with the extension angle a by changing the design angles $\chi 2$ through $\chi n$. The fold patterns represented by Equation (12), which form the corner of a bellows, can be connected in a great many ways by a designer to create an infinite variety of open cross section and closed cross section bellows which extend long distances with low strain and are ideally suited for making very low cost mass produced plastic bellows via blow molding, vacuum forming, injection molding, or similar processes.

One desirable way a designer can customize $n\beta^*$ of the present invention is to minimize how much the wall angle $n\beta^*$ changes over a specified extension angle range from $\alpha_1$ to $\alpha_2$. The wall angle change is quantified here by computing the root mean square of the wall angle change function $n\Delta\beta^*(\alpha)$ over a range from $\alpha_1$ to $\alpha_2$.

$$n\Delta\beta^*(\alpha) = n\beta^*(\alpha) - \beta\alpha 1^* \quad (15)$$

$$^n\Delta\beta^*_{RMS}(\alpha_1, \alpha_2) = \sqrt{\frac{\int_{\alpha_1}^{\alpha_2} (^n\Delta\beta^*(\alpha))^2 \, d\alpha}{\alpha_2 - \alpha_1}} \quad (16)$$

For the sake of discussion, Equation (16) will be referred to as the RMS distortion of a bellows wall angle.

Another desirable way a designer can customize $n\beta^*$ of the present invention is to make a bellows have exactly zero wall tilting at a non zero extension length. More specifically, the "n" inversion fold patterns of the present invention can be designed so that as α is extended beyond the initial extension angle α1, the wall angle $n\beta^*$ deviates slightly from its initial value $\beta\alpha1^*$ and then returns back to $\beta\alpha1^*$ at some second root extension angle $\alpha_{r2}$, allowing a bellows to be free of elastic strain at the second root extension angle $\alpha_{r2}$. Fold patterns having a second root extension angle, which are unique to the present invention, are ideal for manufacturing because they can be easily manufactured with zero wall tilt in an extended state while also providing exactly zero distortion of the bellows panels in the compressed state. In contrast, all prior art folds, including the single inversion, the classic double inversion, and the Pavchinskii double inversion, have only one root extension angle. Therefore, if these prior art folds are formed in an extended state with zero wall tilt, the walls will tilt continuously as the bellows is compressed, causing severe crinkling and buckling of a closed cross section bellows if it is made from non rubbery materials. Also, fold patterns of the present invention having a second root extension angle can be used to make bellows for expanding structures and collapsible containers, which tend to pop open to the zero strain $\alpha_{r2}$ position when expanded, and pop closed to the zero strain $\alpha_1$ position when compressed.

To find each extension angle root $\alpha_{ri}$ of a fold pattern, Equation (15) is set to zero yielding $$n\beta^*(\alpha) - \beta\alpha1^* = 0 \quad (17)$$

and all values of α which satisfy Equation (17) are solved for numerically. By the definition of $\beta\alpha1^*$, Equation (17) will always have a first root at $\alpha = \alpha_1$. In general, for an "n" inversion fold pattern of the present invention, Equation (17) can have a maximum of n−1 roots beyond $\alpha_1$, meaning that a bellows using an "n" inversion fold pattern can have at most n−1 positions beyond the initial extension angle at which zero wall tilt is present.

Figure 7:
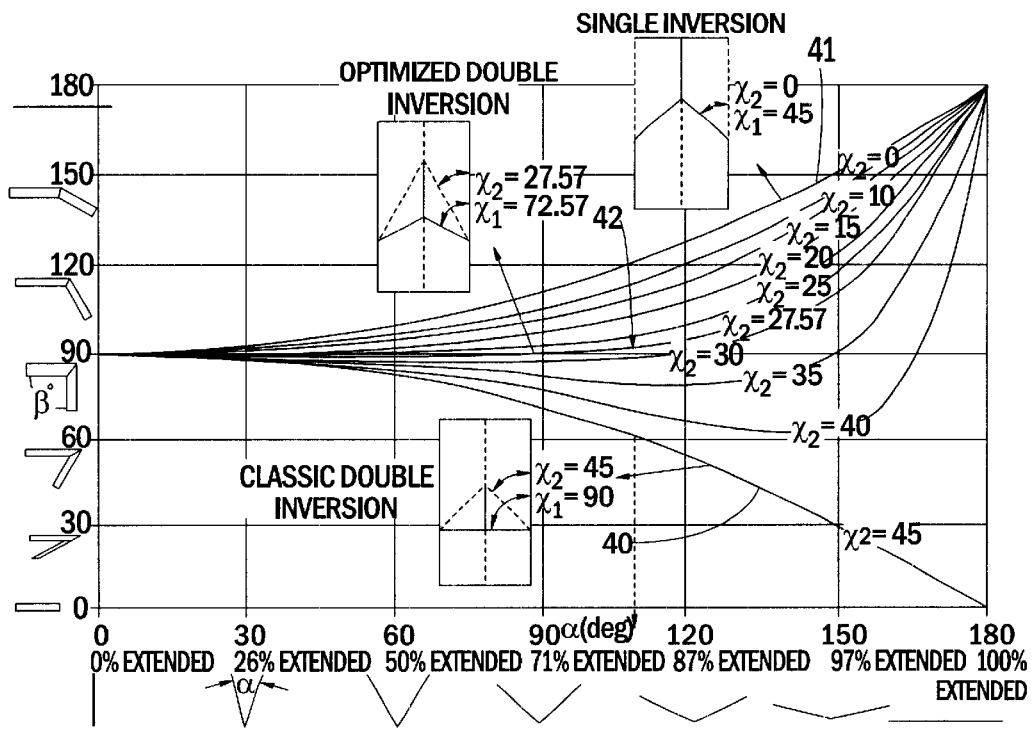
FIG. 7 is a plot showing how the wall angle of various double inversions varies with the extension angle.

In a specific application of the equations just derived, FIG. 7 shows a plot of how the wall angle of a general double inversion varies with α and χ2, when the initial wall angle is 90 degrees. Underneath the α axis is shown the percentage by which the fold is extended, which is defined as $$\% \text{ Extended} = 100\% \cdot \sin(\alpha/2) \quad (18)$$

In general, designers seek to achieve the highest possible percent extension in order to reduce the material required, reduce the compressed length, reduce the bellows weight, and reduce the number of folds of a bellows.

With $\beta\alpha1^* = 90$ degrees, n=2, and $\alpha_1 = 0$, Equation (14) yields the relation $\chi1 = 45 + \chi2$ degrees, leaving $\chi2$ to be varied arbitrarily. Trajectory 42 shows a useful $\chi1 = 72.57$, $\chi2 = 27.57$ embodiment of the present invention; a double inversion which has been optimized to minimize the RMS distortion in the range from a $\alpha_1 = 0$ to $\alpha_2 = 120$ degrees. By visual inspection, one can see how much less trajectory 42 deviates from 90 degrees than do trajectories 41 and 40, which correspond respectively to a single inversion and a classic double inversion. Quantitatively, in the range from a $\alpha_1 = 0$ to $\alpha2 = 120$ degrees, $2\Delta\beta^*\text{RMS} = 16.51$ degrees for either of the prior art folds, and $2\Delta\text{RMS} = 1.35$ degrees (12.2 times smaller than what the prior art folds impose) for the $\chi1 = 72.57$, $\chi2 = 27.57$ embodiment of the present invention.

In addition to imposing low wall distortion, the $\chi1 = 72.57$, $\chi2 = 27.57$ embodiment of the present invention has a second root extension angle of $\alpha = 106.1$ degrees, and hence can be manufactured with zero wall tilt at $\alpha = 106.1$ degrees while also imposing zero wall tilt when fully compressed. As mentioned earlier, bellows of the present invention which have a second root extension angle are easily blow molded, thermoformed, or injection molded while in the second root extended state, and can then be compressed without imposing gross distortions on the bellows material.

For reference, Table 1 shows a family of optimized minimal distortion double inversion embodiments that have a 90 degree initial wall angle.

TABLE 1

| Minimal Distortion Double Inversions $\beta_0^* = 90$ degrees | | | | | RMS Distortion | Single Inversion $\chi_1 = 45$, $\chi_2 = 0$ | Classic Double Inversion $\chi_1 = 90$, $\chi_2 = 45$ | Factor distortion is |
|---|---|---|---|---|---|---|---|---|
| $\chi_1$ | V | $\chi_{\alpha2}$ | $\chi_2$ | % Extended | $^2\Delta\beta^*_{RMS}(0, \alpha_2)$ | $^2\Delta\beta^*_{RMS}(0, \alpha_2)$ | $^2\Delta\beta^*_{RMS}(0, \alpha_2)$ | reduced |
| 67.5 | 22.5 | 0 | 0 | 0% | 0 | 0 | 0 | — |
| 67.76 | 22.76 | 25.99 | 30 | 26% | 0.004 | 0.92 | 0.92 | 259.2 |
| 68.59 | 23.59 | 52.16 | 60 | 50% | 0.061 | 3.77 | 3.77 | 62.0 |
| 70.10 | 25.10 | 78.75 | 90 | 71% | 0.349 | 8.83 | 8.83 | 25.3 |
| 72.57 | 27.57 | 106.10 | 120 | 87% | 1.354 | 16.51 | 16.51 | 12.2 |
| 76.69 | 31.69 | 134.93 | 150 | 97% | 4.716 | 27.17 | 27.17 | 5.8 |

As can be seen, from small values to large values of extension angle limit $\alpha_2$, the minimal distortion embodiments produce many times less RMS distortion than the prior art folds, and they each have a second root extension angle $\alpha_{r2}$, making them ideally suited for forming in an extended state.

An important design rule for all double inversion folds is that as the extension limit $\alpha_2$ approaches zero, the second root extension angle $\alpha_{r2}$ approaches zero as well, and the optimum design angles which create minimal RMS distortion approach lower the limits in radians given by $$\chi_1 = \frac{\pi}{2} - \frac{\beta_o^*}{4} \quad (19)$$

$$\chi_2 = \frac{\beta_o^*}{4} \quad (20)$$

where βo* is the initial wall angle specified by the designer when α=0. For example, as is shown in Table 1, for which βo*=90 degrees, the minimal distortion design angles shown are all larger than the lower limits of χ1=67.5 degrees and χ2=22.5 degrees computed from Equation (19) and (20).

Applying Equations (19) and (20) to a hexagonal bellows with an initial wall angle of 120 degrees yields lower limit design angles of χ1=60 degrees and χ2=30 degrees, which are the prior art design angles of the Pavchinskii double inversion. While the Pavchinskii design is geometrically elegant and symmetrical, it does not provide minimal RMS distortion, and it does not have a second root extension angle, making blow molding and thermoforming such a bellows more problematic. For comparison, the RMS distortion when $\alpha_2$=120 degrees for the Pavchinskii double inversion is 3.62 degrees, while for an equivalent optimal fold of the present invention, for which χ1=66.18 degrees and χ2=36.18 degrees, the RMS distortion is reduced 3 times to 1.17 degrees. Furthermore, the Pavchinskii double inversion does not have a second root extension angle, whereas the χ1=66.18 degree, χ2=36.18 degree embodiment of the present invention does have a second root extension angle at α=105.8 degrees, allowing for zero distortion blow molding or thermoforming in α=105.8 degree extended state.

After coding Equation (12) and a numerical version of (16) into macros on an Excel® spreadsheet and using the Excel Solver® multivariable optimization algorithm, the RMS distortion for double, triple and quadruple inversions has been minimized for several initial wall angles over several extension angle ranges, providing designers with a very powerful and useful plot for comparing the advantages of various embodiments of the present invention. For comparison, Trajectories 51, 52, and 53 show the RMS distortion of single inversions with initial wall angles βo* of 90 degrees, 120 degrees, and 144 degrees, respectively. These three values for wall angle βo* correspond respectively to the wall angels of a square, a hexagon, and a uniform ten sided polygon, and hence span a wide spectrum of possible bellows designs. Trajectories 55, 56, and 57 show the RMS distortion of classic double inversions with initial wall angles βo* of 90 degrees, 120 degrees, and 144 degrees, respectively. Trajectory 58 shows the RMS distortion of a Pavchinskii double inversion, for which βo* is 120 degrees, χ1=60 degrees, and χ2=30 degrees. Trajectories 60, 61, and 62 show the RMS distortion of optimized double inversions of the present invention with initial wall angles βo* of 90 degrees, 120 degrees, and 144 degrees, respectively. Trajectories 64, 65, and 66 show the RMS distortion of optimized triple inversions of the present invention with initial wall angles βo* of 90 degrees, 120 degrees, and 144 degrees, respectively. Trajectories 68, 69, and 70 show the RMS distortion of optimized quadruple inversions of the present invention with initial wall angles βo* of 90 degrees, 120 degrees, and 144 degrees, respectively.

Figure 8:
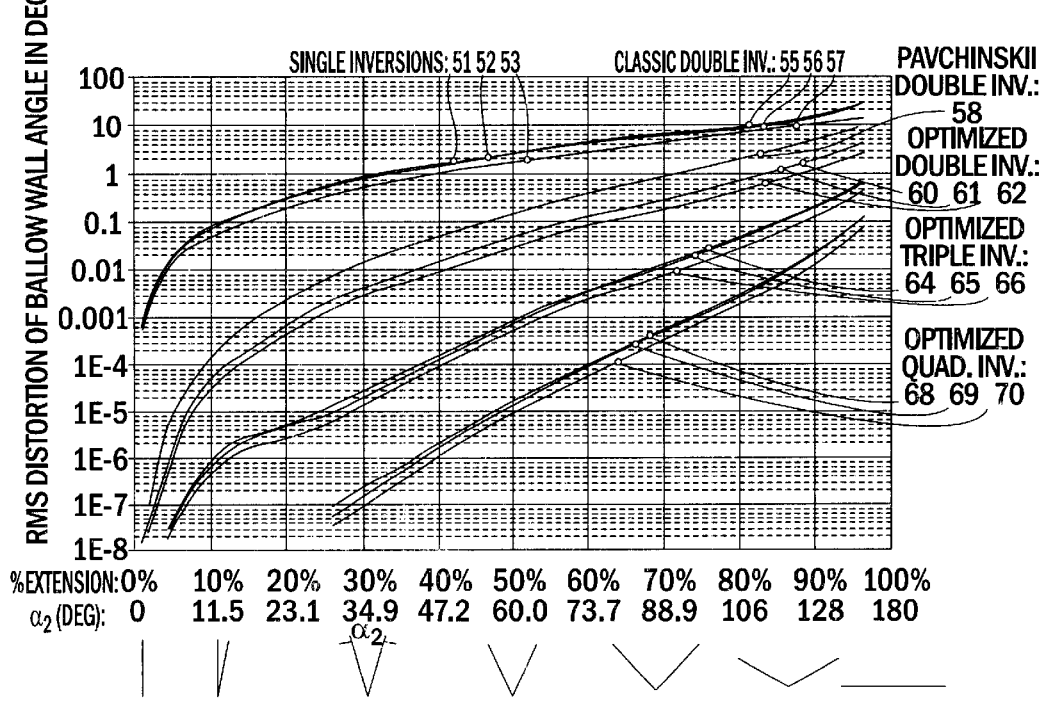
FIG. 8 is a plot which shows the RMS wall angle distortion imposed by prior art folds and folds of the present invention.

An easy to remember approximate result shown in FIG. 8 is that for a given range limit a2, an optimized double inversion imposes better than 10 times less RMS distortion than the single inversions and classic double inversions, an optimized triple inversion imposes better than 100 times less, and an optimized quadruple inversion imposes better than 1000 times less. Another useful rule of thumb is that the RMS distortion of the optimized inversions grows about an order of magnitude for every 20% of extension. Thus, if a design demands very low RMS distortion, they can achieve very much lower distortions by increasing the number of inversions from two to three, or if the simplicity of the double inversion is sought to keep tooling costs low, the extension limit can be reduced by about 20% to achieve roughly the same results.

FIG. 8 is readily used by a designer to estimate how much farther a bellows of the present invention can extend than prior art bellows, given an allowed RMS distortion. For example, suppose a designer wants to make a square closed cross section bellows from a foldable sheet of plastic material, such as a 0.01 inch thick polypropylene sheet, which is compliant enough to tolerate an RMS distortion of 1 degree. From FIG. 8, for an RMS distortion of 1 degree, single inversions and classic double inversions could extend about 27%, an optimized double inversion could extend about 83% (3.07 times farther), and optimized triple or quadruple inversions could Fextend more than 97% (3.6 times farther). For this example, a designer could reduce the material used, the mass, the bellows surface area, the number of folds required, and the compressed length by a factor of about 3 using an optimized double inversion, and about 3.6 using optimized triple and quadruple inversions. The compressed length of the bellows, which is also a very important design consideration, can be reduced by up to the same respective factors of improvement, depending on how the fold inversions are arranged on a particular bellows. All of these improvements are tremendously useful to a designer, because they both reduce the cost and improve the performance of the bellows.

For further reference, Table 2 shows minimal distortion design angles which were calculated for βo* =60 degrees, 90 degrees, 120 degrees, and 144 degrees, over a range of extension angle limits $\alpha_2$.

TABLE 2

| $\beta_0^*$ = 60 degrees | | Minimal Distortion Double Inversions | | Minimal Distortion Triple Inversions | | | Minimal Distortion Quadruple Inversions | | | |
|---|---|---|---|---|---|---|---|---|---|---|
| $\alpha_2$ | % Extended | $\chi_1$ | $\chi_2$ | $\chi_1$ | $\chi_2$ | $\chi_3$ | $\chi_1$ | $\chi_2$ | $\chi_3$ | $\chi_4$ |
| 30 | 26% | 75.19 | 15.19 | 80.18 | 40.52 | 20.34 | 82.92 | 54.20 | 39.32 | 8.04 |
| 60 | 50% | 75.77 | 15.77 | 80.61 | 41.77 | 21.16 | 83.05 | 54.59 | 39.61 | 8.07 |
| 90 | 71% | 76.84 | 16.84 | 81.46 | 44.31 | 22.85 | 83.65 | 56.90 | 41.97 | 8.72 |
| 120 | 87% | 78.60 | 18.60 | 82.81 | 48.52 | 25.71 | 84.72 | 61.12 | 46.40 | 9.99 |

TABLE 2-continued

| 150 | 97% | 81.62 | 21.62 | 85.01 | 55.85 | 30.84 | 86.41 | 68.20 | 54.16 | 12.36 |

| $\beta_0^* = 90$ degrees | | Minimal Distortion Double | | Minimal Distortion Triple | | | Minimal Distortion Quadruple Inversions | | | |
|---|---|---|---|---|---|---|---|---|---|---|
| | % Extended | Inversions | | Inversions | | | | | | |
| $\alpha_2$ | ed | $\chi_1$ | $\chi_2$ | $\chi_1$ | $\chi_2$ | $\chi_3$ | $\chi_1$ | $\chi_2$ | $\chi_3$ | $\chi_4$ |
| 30 | 26% | 67.76 | 22.76 | 75.19 | 45.37 | 15.19 | 79.09 | 57.16 | 34.80 | 11.73 |
| 60 | 50% | 68.59 | 23.59 | 75.90 | 46.80 | 15.91 | 79.48 | 58.03 | 35.55 | 12.00 |
| 90 | 71% | 70.10 | 25.10 | 77.14 | 49.36 | 17.22 | 80.46 | 60.46 | 38.06 | 13.07 |
| 120 | 87% | 72.57 | 27.57 | 79.12 | 53.58 | 19.46 | 82.04 | 64.43 | 42.33 | 14.93 |
| 150 | 97% | 76.69 | 31.69 | 82.37 | 60.86 | 23.49 | 84.55 | 71.07 | 49.92 | 18.40 |

| $\beta_0^* = 120$ degrees | | Minimal Distortion Double | | Minimal Distortion Triple | | | Minimal Distortion Quadruple Inversions | | | |
|---|---|---|---|---|---|---|---|---|---|---|
| | % Extended | Inversions | | Inversions | | | | | | |
| $\alpha_2$ | ed | $\chi_1$ | $\chi_2$ | $\chi_1$ | $\chi_2$ | $\chi_3$ | $\chi_1$ | $\chi_2$ | $\chi_3$ | $\chi_4$ |
| 30 | 26% | 60.32 | 30.32 | 70.30 | 50.46 | 10.16 | 75.52 | 60.96 | 31.14 | 15.70 |
| 60 | 50% | 61.33 | 31.33 | 71.14 | 51.76 | 10.62 | 75.98 | 61.71 | 31.74 | 16.01 |
| 90 | 71% | 63.18 | 33.18 | 72.75 | 54.26 | 11.52 | 77.24 | 63.93 | 34.05 | 17.37 |
| 120 | 87% | 66.18 | 36.18 | 75.33 | 58.38 | 13.06 | 79.31 | 67.62 | 38.10 | 19.79 |
| 150 | 97% | 71.02 | 41.02 | 79.55 | 65.38 | 15.84 | 82.63 | 73.72 | 45.37 | 24.28 |

| $\beta_0^* = 144$ degrees | | Minimal Distortion Double | | Minimal Distortion Triple | | | Minimal Distortion Quadruple Inversions | | | |
|---|---|---|---|---|---|---|---|---|---|---|
| | % Extended | Inversions | | Inversions | | | | | | |
| $\alpha_2$ | ed | $\chi_1$ | $\chi_2$ | $\chi_1$ | $\chi_2$ | $\chi_3$ | $\chi_1$ | $\chi_2$ | $\chi_3$ | $\chi_4$ |
| 30 | 26% | 54.35 | 36.35 | 66.34 | 54.43 | 6.10 | 72.64 | 63.92 | 28.12 | 18.85 |
| 60 | 50% | 55.46 | 37.46 | 67.27 | 55.64 | 6.36 | 73.16 | 64.61 | 28.64 | 19.19 |
| 90 | 71% | 57.49 | 39.49 | 69.19 | 58.12 | 6.93 | 74.64 | 66.66 | 30.80 | 20.78 |
| 120 | 87% | 60.77 | 42.77 | 72.18 | 62.05 | 7.86 | 77.08 | 70.08 | 34.61 | 23.61 |
| 150 | 97% | 65.94 | 47.94 | 77.12 | 68.68 | 9.56 | 81.02 | 75.70 | 41.51 | 28.83 |

In general, Equations (12) and (16) are easily used by a designer to compute minimal distortion design angles such as those shown in Table 2 given any initial wall angle and given any extension angle limit $\alpha_2$.

Figure 9:
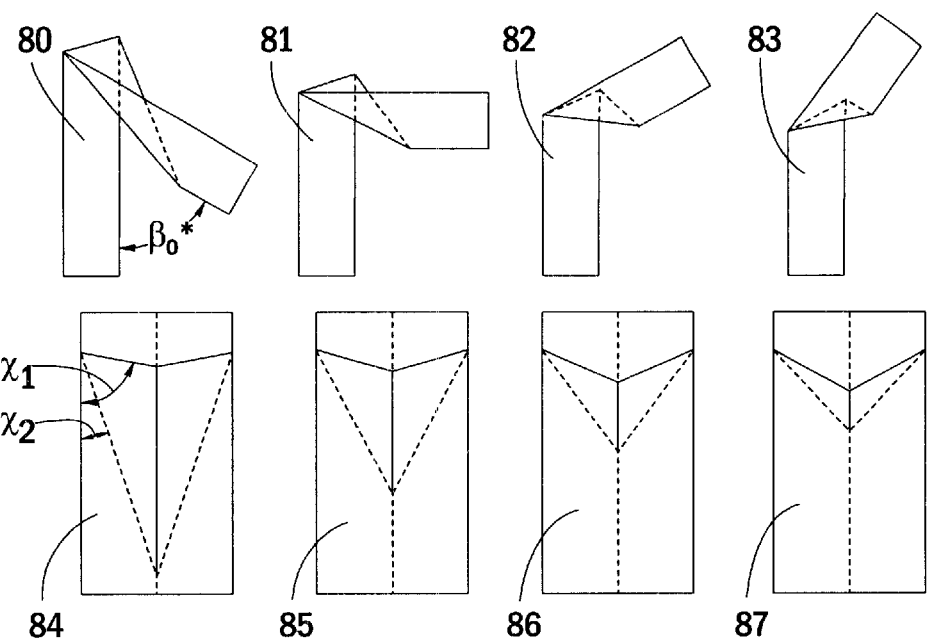
FIG. 9 shows scale drawings of some double inversions optimized to have minimal distortion up to an extension limit of 120 degrees.
Figure 10:
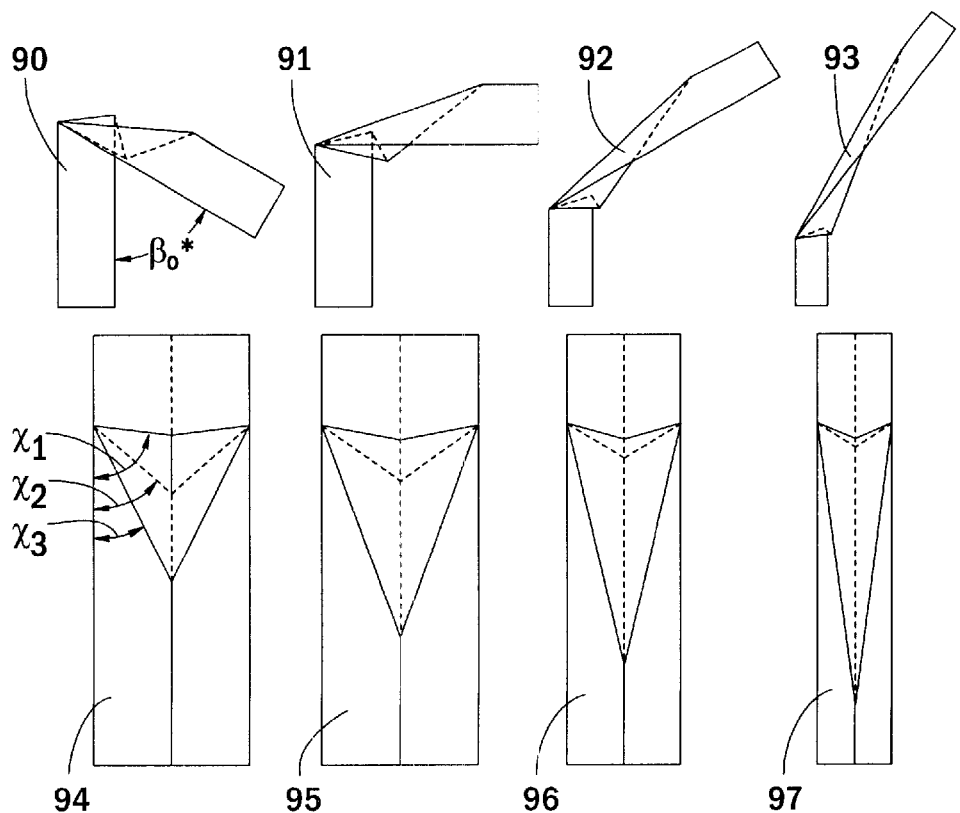
FIG. 10 shows scale drawings of some triple inversions optimized to have minimal distortion up to an extension limit of 120 degrees.

To show examples of what some of the optimized folds look like, FIG. 9, FIG. 10 and FIG. 11 show scale drawings of optimized double, triple, and quadruple inversions, respectively, with initial wall angles of $\beta_0^*=60$ degrees, 90 degrees, 120 degrees and 144 degrees, whose design angles correspond to the minimal distortion values shown in Table 2 with the extension angle limit $\alpha_2=120$ degrees. FIG. 9 shows folded views 80, 81, 82, 83 and their respective flattened views 84, 85, 86, 87, of double inversions with initial wall angles of $\beta_0^*=60$ degrees, 90 degrees, 120 degrees and 144 degrees, respectively. FIG. 10 shows folded views 90, 91, 92, 93 and their respective flattened views 94, 95, 96, 97, of triple inversions with initial wall angles of $\beta_0^*=60$ degrees, 90 degrees, 120 degrees and 144 degrees, respectively. FIG. 11 shows folded views 100, 101, 102, 103 and their respective flattened views 104, 105, 106, 107, of quadruple inversions with initial wall angles of $\beta_0^*=60$ degrees, 90 degrees, 120 degrees and 144 degrees, respectively.

By using a few simple design techniques for connecting folds, a designer can construct an infinite variety of useful bellows using the customizable fold patterns of the present invention. The construction techniques for connecting folds, which are applicable to any bellows design, will be demonstrated via several examples.

In general, the bellows embodiments which will be shown can be made from any foldable material which has the required fatigue life for a given application. Of note, thin gauge polypropylene sheeting, with a thickness in the range from 0.001 inches to 0.015 inches, is an ideal material for forming into bellows of the present invention, because it is known to have a long fatigue life operating as a living hinge, it is highly formable, abrasion resistant, and very low in cost. The thinner gauges could be used for light dust covers, while the thicker gauges could be used for machine tools. To achieve higher structural rigidity, gages thicker than 0.015 inches could be used with notches machined or stamped along the fold lines to facilitate folding. Other suitable materials are ultra high molecular weight polyethylene and polyester sheeting or film. For particular applications, more specialized engineering plastics may be chosen by those skilled in the art of plastic material selection.

To begin, FIG. 12 shows plan view 110 and folded view 111 of an open cross section bellows using several identical minimal distortion double inversions with 90 degree initial wall angles 112 and 113. In the folded view 111 the edges 114, 115, and 116 define a cross sectional profile of the bellows. In the embodiment shown in FIG. 12, successive double inversions such as 117 and 118 point in the same direction allowing easy drainage of chips and fluid off of top bellows panels such as 119, hence making the embodiment useful for machine tools and other applications that involve chips and fluids.

FIG. 13 shows plan view 120 and folded view 121 of an open cross section bellows using several alternating minimal distortion double inversions with 90 degree initial wall angles 122 and 123. In the embodiment shown in FIG. 13, successive double inversions such as 124 and 125 point in alternating directions down the length of the bellows. The advantage of the alternating fold design in FIG. 13 is that it has a compressed length which is two thirds as long as the compressed length of the non alternating design in FIG. 12, given the same amount of material and given fold lengths 126 and 127 are equal. A disadvantage of the alternating fold design is that the double inversions such as 125 which are on top of the bellows could collect chips and other debris, which could eventually cause damage. Therefore, the embodiment shown in FIG. 13 is most useful for applications which do not dump chips onto the bellows, such as for dust covers.

Figure 14:
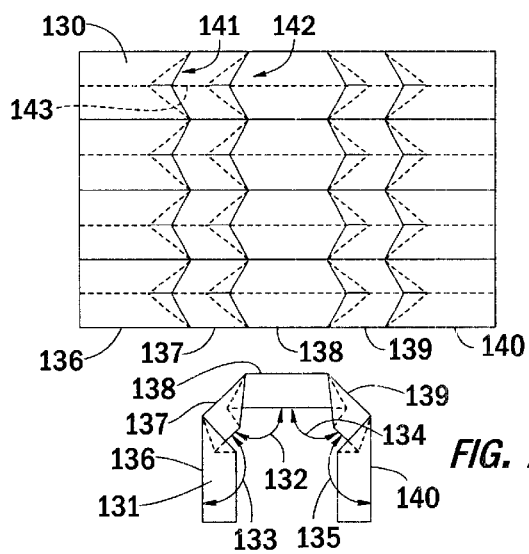
FIG. 14 shows an open cross section bellows using double inversions that have a 135 degree initial wall angle.

FIG. 14 shows plan view 130 and folded view 131 of an open cross section bellows using several identical minimal distortion double inversions with 135 degree initial wall angles 132, 133, 134, and 135. The edges 136, 137, 138, 139, and 140 define a cross sectional profile of the bellows. In the embodiment shown in FIG. 14, the two double inversions 141 and 142 point in the same direction away from top edge 138, allowing for unimpeded fluid drainage from the top of the bellows. As a variation of this design, the double inversions such as 141 and 142 can point in either direction, in any combination. To achieve a shorter compressed length the double inversions such as 141 and 142 can point in alternating directions, as is shown in FIG. 13.

Figure 15:
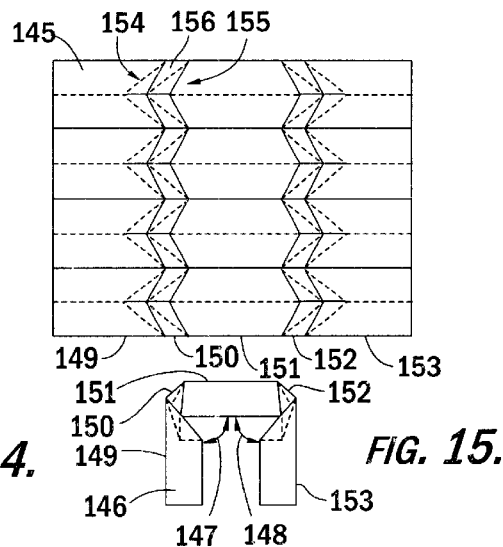
FIG. 15 shows a bellows derived from the one in FIG. 14 by setting the length of some longitudinal inner folds to zero.

FIG. 15 shows plan view 145 and folded view 146 of a useful open cross section bellows derived from the embodiment shown in FIG. 14 by setting the length of the longitudinal inner fold lines such as 143 to zero. The edges 149, 150, 151, 152, and 153 define a cross sectional profile of the bellows. The advantage of this embodiment is that the triangular panels such as 156 present between double inversions such as 154 and 155 increase the structural rigidity of the bellows and thereby reduces its propensity to bow upward in the middle when it is compressed, and also reduces its propensity to sagging under its own weight. Also, this embodiment effectively has 90 degree wall angles 147 and 148, making it interchangeable with the embodiments shown in FIG. 12 and FIG. 13.

Figure 16:
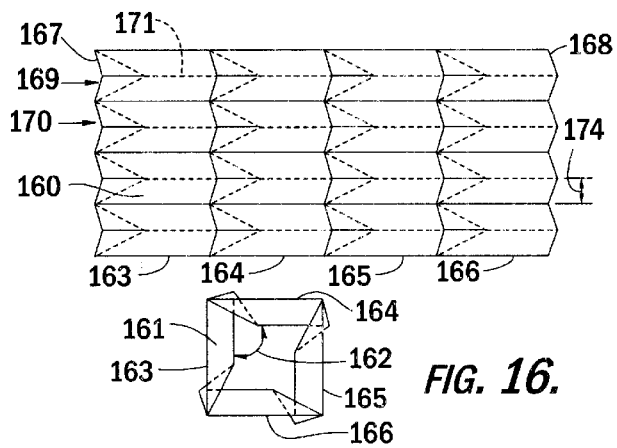
FIG. 16 shows a closed cross section bellows using double inversions that have a 90 degree initial wall angle.

FIG. 16 shows plan view 160 and folded view 161 of an open cross section bellows using several identical minimal distortion double inversions such as 169 and 170 with 90 degree initial wall angles such as 162. In the plan view 160, the lines such as 167 and 168 coincide with one another to form fold, thus creating a continuous closed cross section. The edges 163, 164, 165, and 166 define a cross sectional profile of the bellows. Closed cross section bellows, such as the one shown in FIG. 16, can be folded from a tube, or created by folding one or more sheets separately and then bonding the folded sheets to form a closed cross section.

Figure 17:
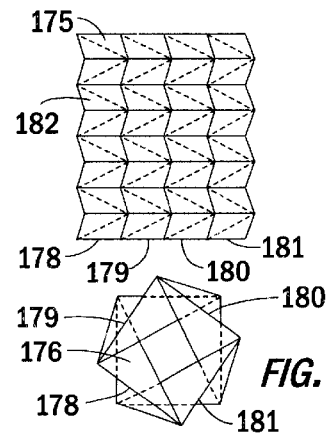
FIG. 17 shows a closed cross section bellows derived from FIG. 16 which has all triangular panels.

FIG. 17 shows plan view 175 and folded view 176 of a closed cross section bellows with all triangular panels such as 182 derived from the embodiment shown in FIG. 16 by setting the length of the longitudinal inner fold lines such as 171 to zero. The edges 178, 179, 180, and 181 define a cross sectional profile of the bellows. The advantage of this embodiment is that the triangular panels such as 182 present at all locations increase the structural rigidity of the bellows and thereby increases its ability to support a positive or negative pressure inside the bellows, and reduces its propensity to buckle when it is compressed and sag under its own weight. As a result, this embodiment is useful for protective applications that require a positive or negative pressure inside the bellows, for low cost pneumatic or hydraulic actuators, and for low cost displacement pumps.

Figure 18:
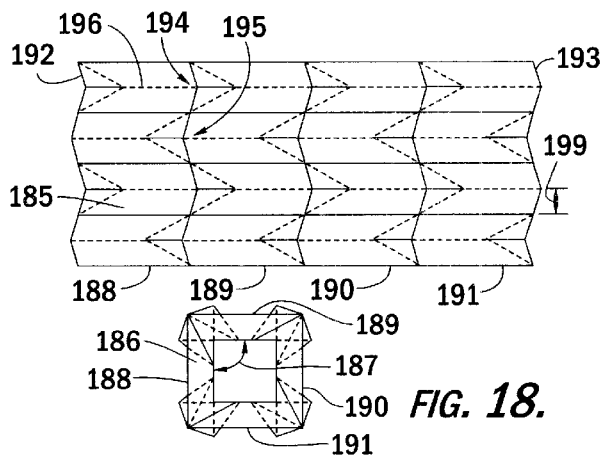
FIG. 18 shows a closed cross section bellows derived from FIG. 16 which has alternating double inversions.

FIG. 18 shows plan view 185 and folded view 186 of a closed cross section bellows using several alternating minimal distortion double inversions with 90 degree initial wall angles such as 187. In the embodiment shown in FIG. 18, successive double inversions such as 194 and 195 point in alternating directions down the length of the bellows. The advantage of the alternating fold design in FIG. 18 is that it has a compressed length which is two thirds as long as the compressed length of the non alternating design in FIG. 16, given the same amount of material and given fold lengths 174 and 199 are equal. As stated for open cross section bellows, a disadvantage of the alternating fold design is that the double inversions such as 194 which are on top of the bellows could collect chips and other debris, which could eventually cause damage. Therefore, the embodiment shown in FIG. 18 is most useful for applications which do not dump chips onto the bellows, such as for dust covers.

Figure 19:
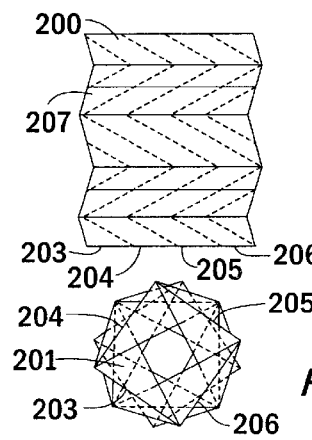
FIG. 19 shows a closed cross section bellows derived from FIG. 18 which has all triangular panels.

FIG. 19 shows plan view 200 and folded view 201 of a closed cross section bellows with all triangular panels such as 207 derived from the embodiment shown in FIG. 18 by setting the length of the longitudinal inner fold lines such as 196 to zero. The edges 203, 204, 205, and 206 define a cross sectional profile of the bellows. Like the embodiment shown in FIG. 17, the advantage of this embodiment is that the triangular panels such as 207 present at all locations increase the structural rigidity of the bellows and thereby increases its ability to support a positive or negative pressure inside the bellows, and reduces its propensity to buckle when it is compressed and to sag under its own weight.

Figure 20:
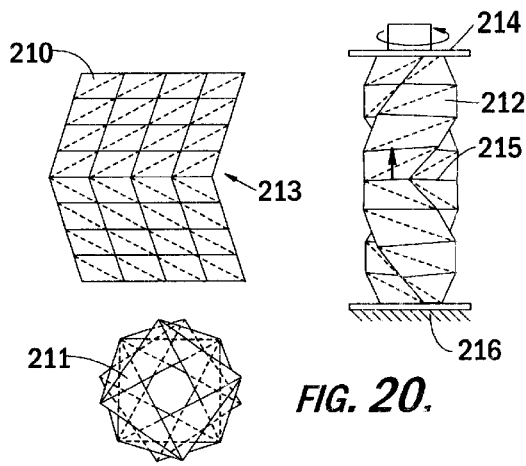
FIG. 20 shows a closed cross section bellows derived from FIG. 19 which has all triangular panels.

FIG. 20 shows plan view 210, folded view 211, and side view 212 of a closed cross section bellows with all triangular panels derived from the embodiment shown in FIG. 19 by taking half of the double inversion 213 and repeating it multiple times up and down the length of the bellows. The resulting bellows can be used in a standard collapsing mode, or it can be used as a novel rotary seal, as is shown in side view 212. When the bottom end 216 is held stationary, the top end 214 can be rotated over a limited angle range, about 90 degrees for the particular embodiment shown, without translating the top end 214. When acting as a rotary seal, the middle fold lines such as 215 translate up and down to accommodate the twisting.

Figure 21:
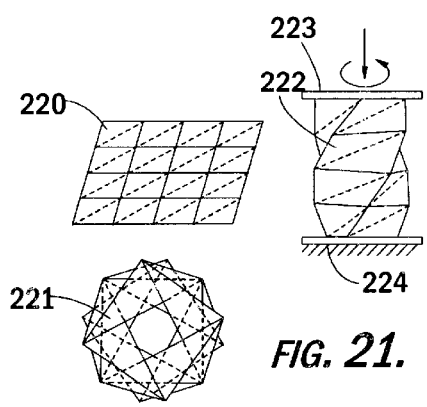
FIG. 21 shows a closed cross section bellows derived from FIG. 20 which has all triangular panels.

FIG. 21 shows plan view 220, folded view 221, and side view 222 of a closed cross section bellows with all triangular panels which consists entirely of half double inversion folds. This bellows has the unusual property that if the bottom end 224 is fixed, when the top end 223 is translated downward it is forced to twist as well. This bellows could be used as a novel hand pump which can be twisted as it is pushed on, to provide extra collapsing force.

Figure 22:
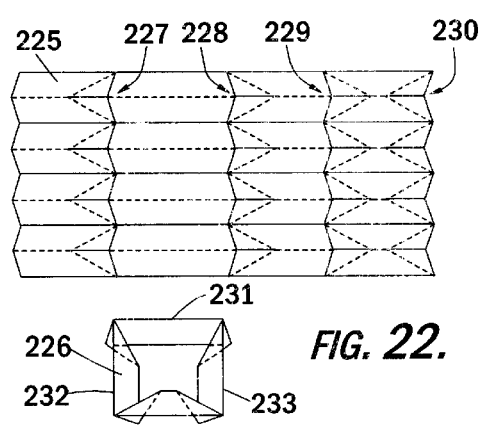
FIG. 22 shows a closed cross section bellows derived from FIG. 16 which uses a different arrangement of the double inversions.

FIG. 22 shows plan view 225 and folded view 226 of a closed cross section bellows with double inversions such as 227, 228, 229, and 230 which are arranged to allow free flow of chips and debris of the top of the bellows 231 and off the sides 232 and 233.

Figure 23:
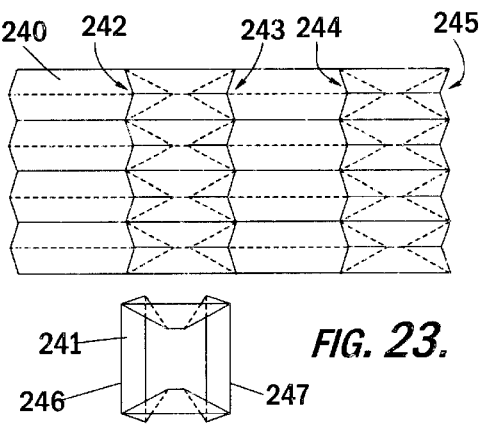
FIG. 23 shows a closed cross section bellows derived from FIG. 16 which uses a different arrangement of the double inversions.

FIG. 23 shows plan view 240 and folded view 241 of a closed cross section bellows with double inversions such as 242, 243, 244, and 245 which are arranged to allow the parallel sides 246 and 247 to avoid obstacles.

Figure 24:
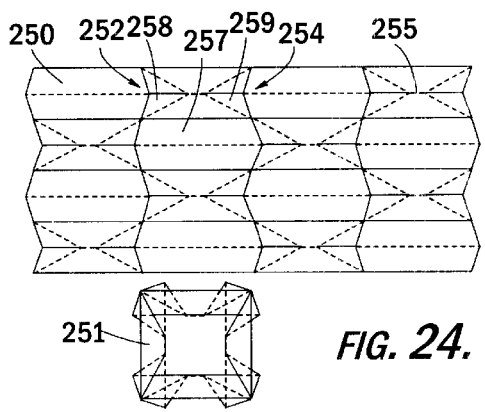
FIG. 24 shows a closed cross section bellows derived from FIG. 18 which uses a different arrangement of alternating double inversions.

FIG. 24 shows plan view 250 and folded view 251 of a closed cross section bellows with inward pointing double inversion pairs such as 252 and 254 which alternate direction down the length of the bellows. As described earlier, the alternating pattern reduces the compressed length to two thirds of the compressed length of a non alternating design such as shown in FIG. 23. This alternating design is also somewhat stiffer and more able to support a pressure inside the bellows, because every trapezoidal panel such as 257 is supported by adjacent triangular panels such as 258 and 259.

Figure 25:
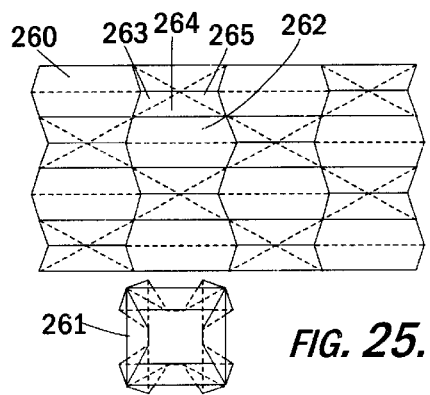
FIG. 25 shows a closed cross section bellows derived from FIG. 24 which has more triangular panels.

FIG. 25 shows plan view 260 and folded view 261 of a closed cross section bellows derived from the embodiment shown in FIG. 24 by setting the length of the longitudinal inner fold segments such as 255 to zero. The result is an even stiffer design more able to support a pressure inside the bellows because every trapezoidal panel such as 262 is supported by three triangular panels such as 263, 264, and 265.

FIG. 26 shows plan view 270 and folded view 271 of a bellows with a triangular closed cross section with all triangular panels, which uses minimal distortion double inversion folds. The triangular design gives very high rigidity and therefore could be useful as a fluid actuator or a pump.

FIG. 27 shows plan view 272 and folded view 273 of a bellows with a hexagonal closed cross section with all triangular panels, which uses minimal distortion double inversion folds. This hexagonal embodiment is useful for protective covers, and for use as a hose that provides relatively low resistance to flow, because its effective inner diameter 274 is relatively large compared to its effective outer diameter 275. Like the other triangular embodiments, it is also useful for fluid actuators and pumps.

FIG. 28 shows plan view 280 and folded view 281 of a bellows with a uniform ten sided closed cross section with all triangular panels, which uses minimal distortion double inversion folds. Due to high structural rigidity, and a large inner diameter 283 compared to the outer diameter 284, the ten sided embodiment shown in FIG. 28 is especially useful as a feather light collapsing hose for conveying air at relatively low pressures. Such a hose would be formed preferably from polypropylene film which is from 0.002 to 0.004 inches thick. One useful application for such a hose is to convey air to a respirator mask worn by a worker in a toxic environment with minimal discomfort to the wearer.

FIG. 29 shows plan view 290 and folded view 291 of a bellows derived from the one shown in FIG. 28 by making the longitudinal inner folds such 292 and 293 non zero in length. The longitudinal inner folds with non zero length reduce the stiffness of the bellows somewhat, thereby reducing the stress at the fold lines somewhat when the double inversion folds impose angular distortions.

FIG. 30 shows plan view 295 and folded view 296 of an open cross section bellows using several minimal distortion triple inversions which point toward each other, such as triple inversions 297 and 298. Unlike double inversions, triple inversions must point either towards or away from each other when they are connected, thus restricting the number of possible arrangements.

FIG. 31 shows plan view 300 and folded view 301 of an open cross section bellows using several minimal distortion triple inversions which point away from each other, such as triple inversions 302 and 303. The edges 304, 305, and 306 define a cross sectional profile of the bellows. Compared to double inversion Bellows, this design has the unique advantage that the distance 307 between edges 304 and 306 remains constant when the bellows is extended, thereby allowing a simple pillow block such as 308 to constrain the bellows laterally without slop. Since many machines already have a pillow block similar to 308 in their design, the FIG. 31 embodiment could constrain itself laterally without any added panels, thus lowering its cost.

FIG. 32 shows plan view 310 and folded view 311 of a rectangular closed cross section bellows using several minimal distortion triple inversions such as 312 and 313. For closed cross section bellows, a general design rule is that triple inversions, like single inversions, can only make bellows with an even number of walls.

FIG. 33 shows plan view 315 and folded view 316 of a rectangular closed cross section bellows derived from the embodiment in FIG. 32 by alternating the triple inversions down the length of the bellows. The alternating pairs of inversions, such as pair 321 with 322 and pair 323 with 324, eliminate some of the longitudinal fold lines which would normally pass through fold line intersections such as 325. The edges 317, 318, 319 and 320 define a cross section of the bellows. The main advantage of the alternating triple inversion design is that the more distributed array of triangular panels make for a stiffer structure which is better able to support a pressure inside of the bellows.

In the same vein as in FIG. 32, FIG. 34 shows plan view 330 and folded view 331 of a six sided closed cross section bellows using several minimal distortion triple inversions. In the same vein as in FIG. 33, FIG. 35 shows plan view 335 and folded view 336 of a six sided closed cross section bellows using several alternating minimal distortion triple inversions.

Figure 40:
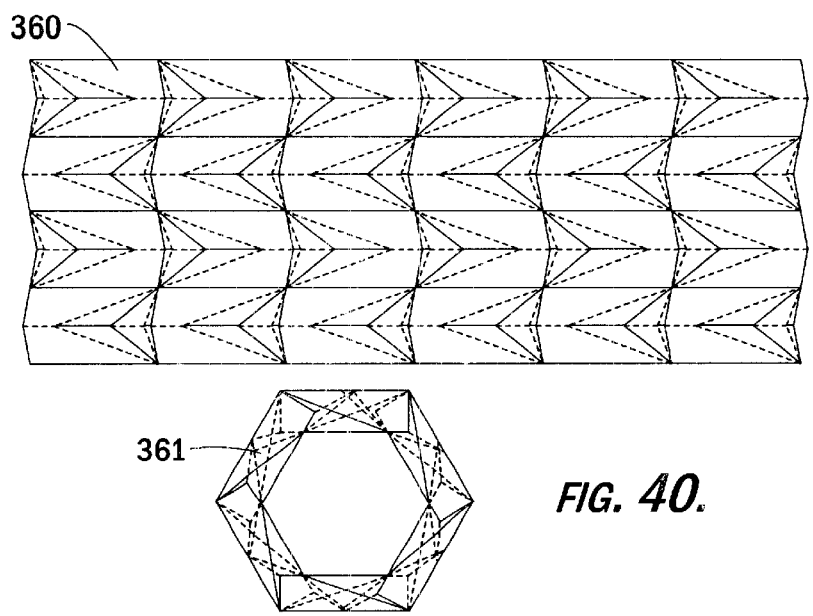
FIG. 40 shows a bellows with a hexagonal cross section that uses quadruple inversions.

The quadruple inversion folds can be combined in the same ways as the double inversion folds to achieve the same types of design objectives as was discussed for the double inversions. Analogous to FIG. 12, FIG. 36 shows plan view 340 and folded view 341 of an open cross section bellows which has quadruple inversions such as 342 and 343 which point in the same direction. Analogous to FIG. 13, FIG. 37 shows plan view 345 and folded view 346 of an open cross section bellows which has quadruple inversions such as 347 and 348 which point in opposite directions, to achieve a shorter compressed length. As examples of closed cross section bellows that use quadruple inversions, FIG. 38 shows plan view 350 and folded view 351 of a triangular cross section bellows using quadruple inversions, FIG. 39 shows plan view 355 and folded view 356 of a square cross section bellows using quadruple inversions, and FIG. 40 shows plan view 360 and folded view 361 of a hexagonal cross section bellows using quadruple inversions.

As was discussed earlier, the bellows fold patterns of the present invention can be made by several manufacturing methods. If foldable plastics are used, bellows of the present invention can be made using vacuum forming, blow molding, injection molding, stamping, or other forming methods known to those skilled in the art of manufacturing plastic parts. Also, the bellows fold patterns of the present invention can be made using more traditional rubberized fabrics and rubbery materials, using manufacturing methods known to those skilled in the art of conventional bellows manufacturing. For the purpose of fast prototyping or small production runs, two novel methods are for making the bellows of the present invention are discussed here.

Figure 41:
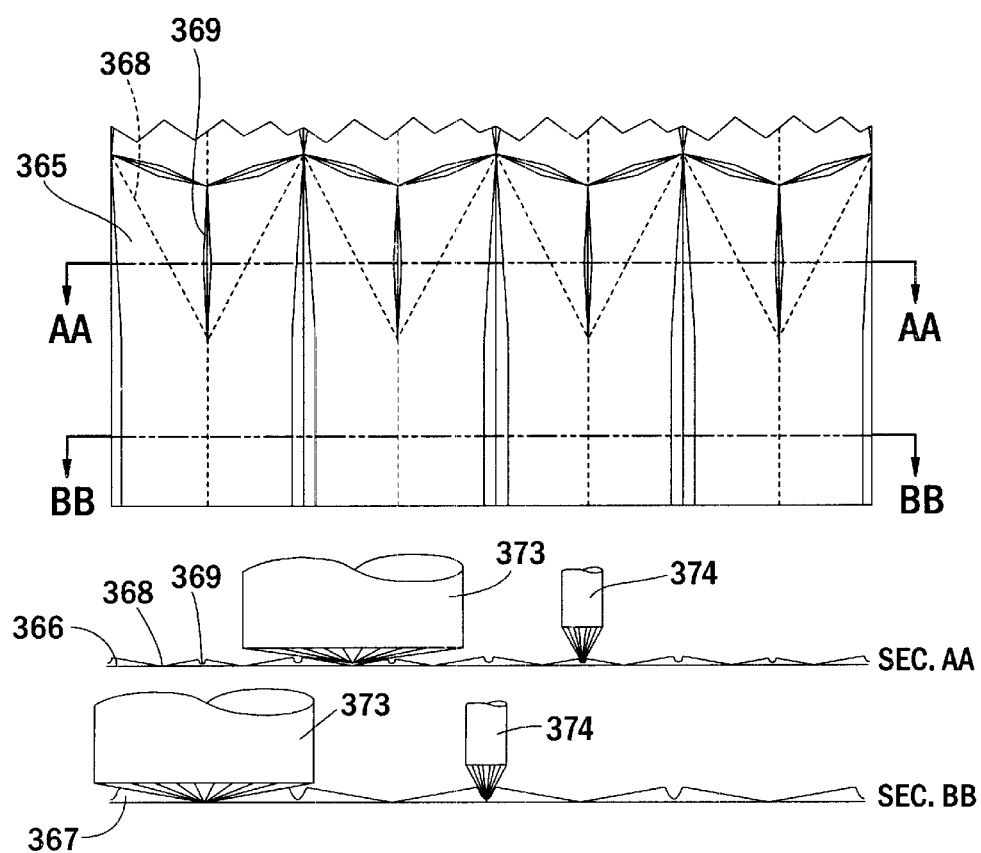
FIG. 41 shows thick sheet of material which has notches machined into it to facilitate folding.

FIG. 41 shows plan view 365, cross sectional view 366, and cross sectional view 367 of a sheet of material with notches machined in its surface to form double inversion fold patterns. Due to their machineability and high fatigue life acting as a living hinge, polypropylene or ultra high molecular weight polyethylene would be suitable materials to use. The sheet of material would typically be 0.02 inches to 0.125 inches thick, depending on the stiffness desired for the bellows. The inner fold lines such as 368 would be machined using an endmill such as 373 with a gradually tapered end. The outer fold lines such as 369 would be machined using an endmill such as 374 with a steeply tapered end. Based on a guideline for polypropylene living hinges, the material thickness along each fold line should be less than about 0.015 inches to achieve a long fatigue life.

Figure 42:
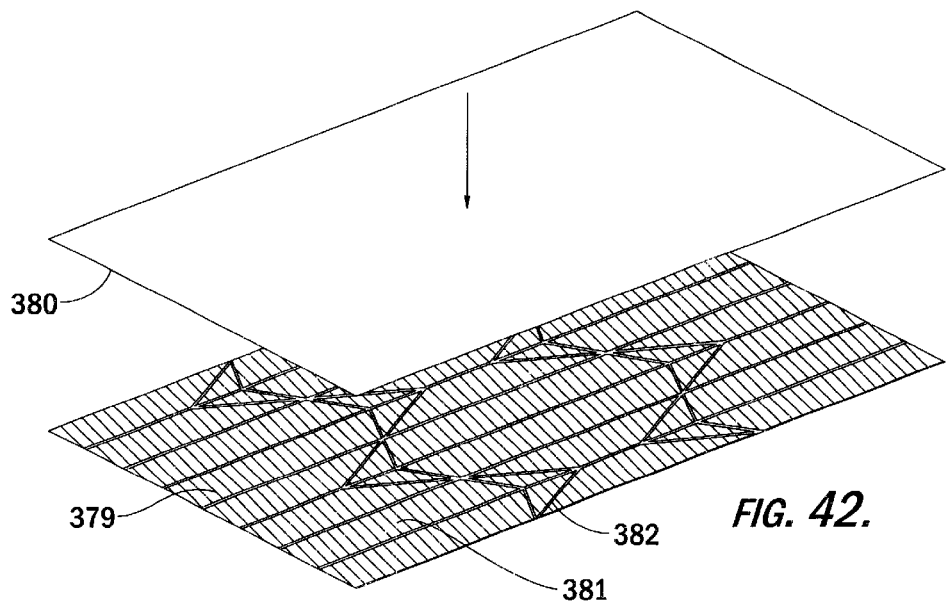
FIG. 42 shows an isometric view of a folding jig with a sheet being lowered on it.
Figure 43:
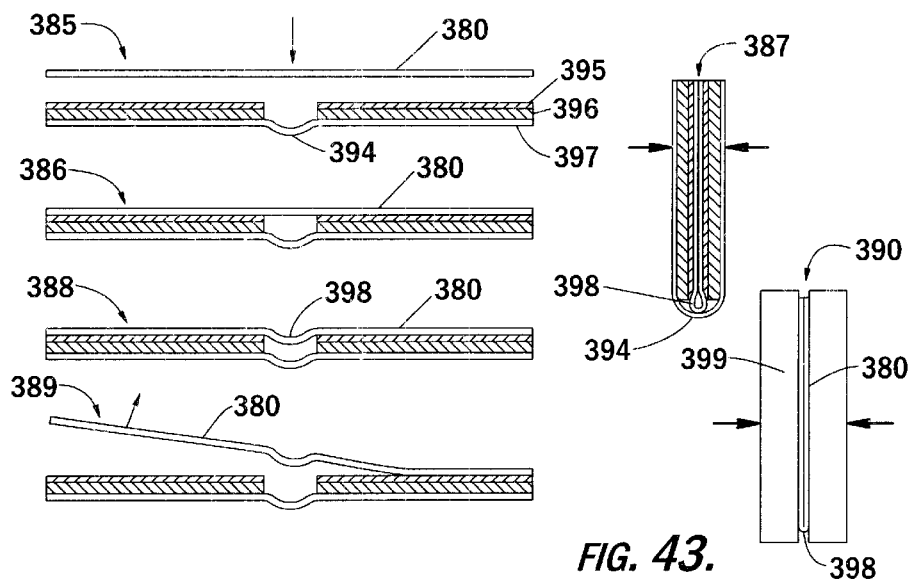
FIG. 43 shows the six steps in a low cost mechanical folding process.

FIG. 42 and FIG. 43 show a very low cost, easy to implement method for accurately folding a thin sheet of material, which is suitable for prototyping or low production runs. FIG. 42 shows a thin sheet of material 380 to be folded into a bellows, and a folding jig 379. The folding jig comprises stiff panels with a tacky surface 381 which are bonded on top of a sheet of a foldable material. The stiff panels are sized so that there are narrow gaps between them, such as gap 382, along the fold lines of the bellows. FIG. 43 shows a sample cross section of the folding jig and how it works. The folding jig comprises a tacky adhesive layer 395 on top of a stiff panel 396 which is bonded to a prefolded sheet 397. For step 1 of the folding process, shown in view 385, the sheet 380 is lowered onto the tacky adhesive 395. For step 2, shown in view 386, sheet 380 is pressed onto the tacky adhesive 395, providing a firm but non permanent bond. For step 3, shown in view 387, the jig is folded along every fold line and pressed together firmly. For step 4, shown in view 388, the jig is laid flat, revealing permanent but non sharp folds such as 398 in sheet 380. For step 5, shown in view 389, sheet 380 is peeled off the tacky but non permanent adhesive layer. For the final step 6, shown in view 390, folds such as 398 are made sharper and more defined by squeezing the folded sheet 380 in a press 399. For plastic materials, the folds can be made sharper and more permanent by applying heat during pressing.

Figure 44:
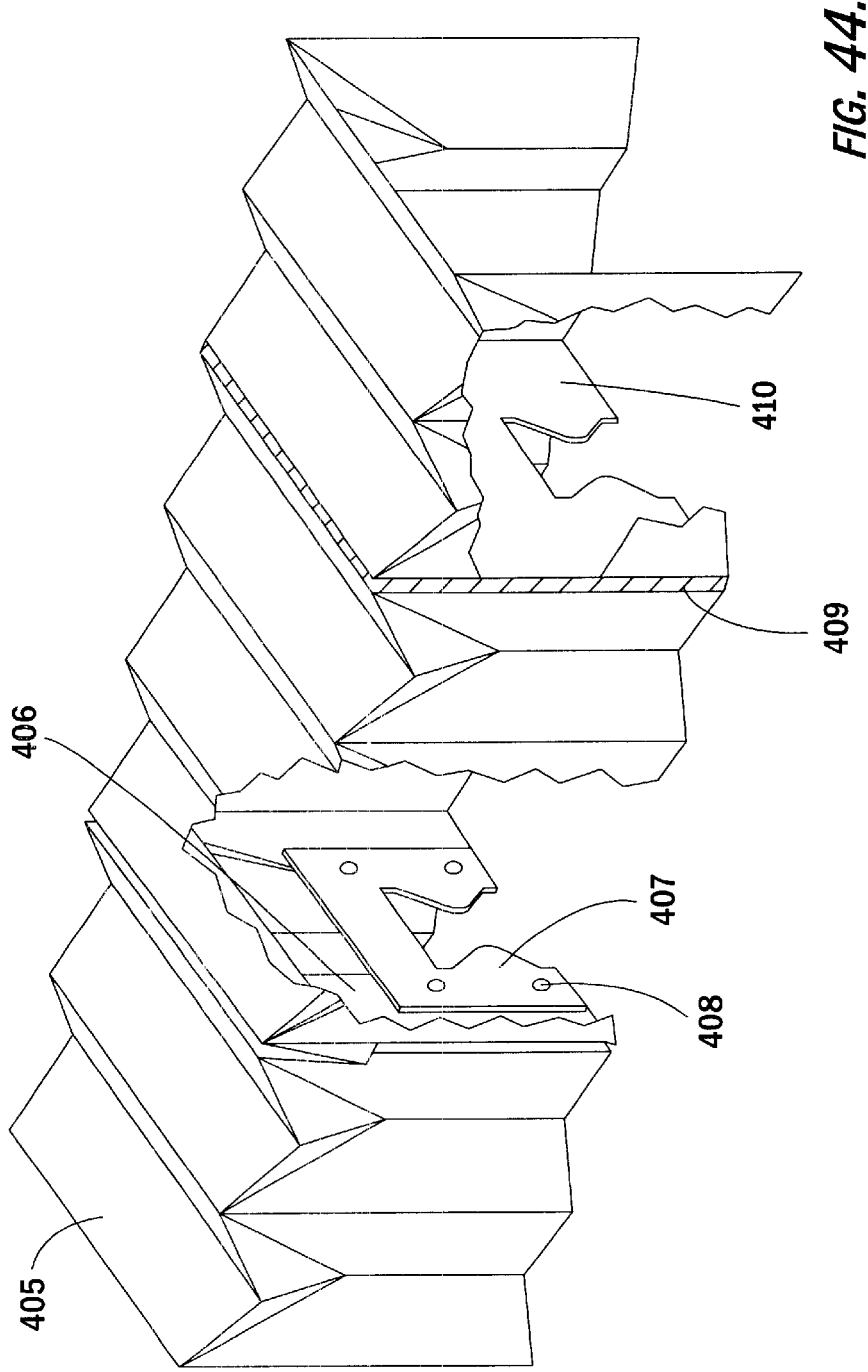
FIG. 44 is a schematic view showing one half of a folded bellows in accordance with the subject invention.

For the case of way covers for machine tools, some guiding panels may be needed to constrain the bellows relative to a profile rail. To accomplish this, guiding panels can be attached to the bellows of the present invention between some of the folds. FIG. 44 shows two ways guiding panels may be attached to bellows 405. For the first method, guiding panel 407 is riveted to bellows panel 406 using rivets such as 408. For the second method, guiding panel 410 is bonded along flat section 409 which has been formed into bellows 405 for the purpose of attachment.

A folded metal Bellows can also be manufactured in accordance with this invention.

The following presents the formulas needed to design a twist folded bellows and a practical design example using the formulas discussed above. Sample input parameters needed to calculate all important twist folded bellows characteristics are set forth as follow in Table 3.

TABLE 3

| Input parameters: |
| --- |
| Wall thickness of tube: t |
| Maximum allowable bending strain of tube material: $\epsilon_{max}$ |
| Number of bellows sides: $n_s$ |
| Mean perimeter of tube: P |
| Mean fold radius: $r_f$ |
| Number of convolutions bellows has: $n_p$. |

All important characteristics of a twist folded bellows may be computed from the given input parameters. First, the critical dimensions of the forming mandrel are calculated.

$$\text{The mandrel corner radius is: } r_c = r_f - \frac{t}{2} \quad (21)$$

$$\text{The mandrel center to flat distance is: } c_{cf} = \frac{(P - \pi t) - 2\pi r_c}{2n_s \tan(\pi/n_s)} + r_c \quad (22)$$

The mandrel center to corner distance is:

$$c_{cc} = \frac{(P - \pi t) - 2\pi r_c}{2n_s \sin(\pi/n_s)} + r_c$$

To illustrate the input and mandrel dimensions that have been presented, FIGS. 45A and 45B show a hexagonal mandrel 500 inside a seamed or seamless thin walled metal tube 501 (e.g. steel, aluminum, titanium and the like) which has a mean perimeter P 503 and wall thickness t 502. The wall thickness of tube is shown greatly exaggerated for illustrative purposes. In practice, the wall thickness is typically less than 0.004 in. Mandrel 500 has corner radius $r_c$ 504, a center to flat distance $C_{cf}$ 505, and center to corner distance $C_{cc}$ 506. This example is based on a hexagon bellows but any regular polygon shaped bellows could be formed in accordance with this invention.

Figure 46:
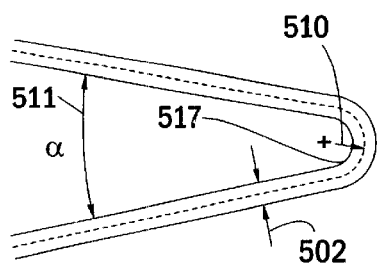
FIG. 46 is a schematic view showing an inner curvature of a convolution where the maximum bending strain occurs in the bellows material as the extension angle changes.

FIG. 46 shows a portion of a bellows convolution or pleat with a wall thickness t 502 and mean fold radius $r_f$ 510. While the present folding theory more aptly applies when the mean fold radius at all fold lines approaches zero, the typical fold radius used, which is 0.02 inches or smaller, is close enough to zero for the present folding theory to apply with adequate accuracy.

Figure 47:
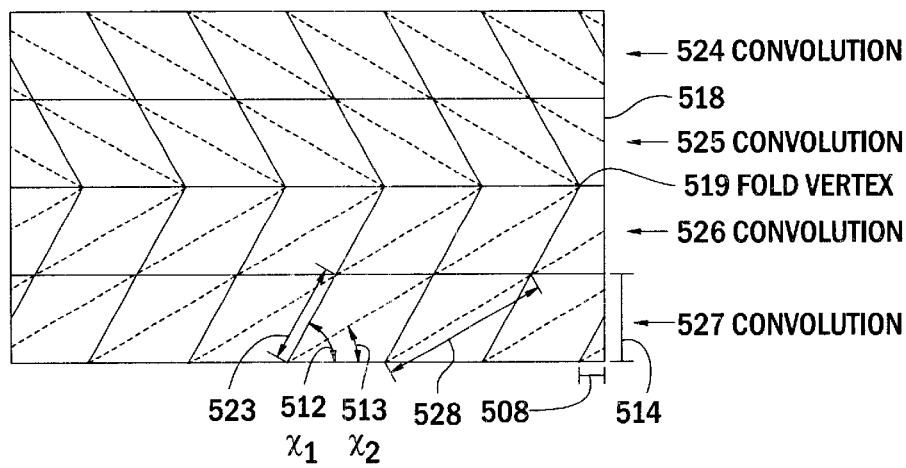
FIG. 47 is a view of the folded lines in a metal tube in accordance with this invention.

Applying the present folding theory, the first design angle $\chi_1$, FIG. 47 and the second design angle $\chi_2$ are now calculated. Examples are first design angle $\chi_1$ 512 and second design angle $\chi_2$ 513 are shown in FIG. 47 on a flattened sheet used to form a hexagonal bellows. Each of the four convolutions 524, 525, 526, and 527 have the same design angles. One relation between $\chi_1$ and $\chi_2$ comes from the initial wall angle $^2\beta^*$ of the bellows, which must be equal to the wall angle of a uniform polygon with $n_s$ sides.

Substitution of the initial wall angle equation above into equation (14) (and setting n=2 inversions) gives a relation for $\chi_1$.

$$\chi_1 = \pi/n_s + \chi_2$$

The second design angle $\chi_2$ is determined by the maximum allowable change in extension angle $\Delta\alpha_{max}$ that a bellows convolution can undergo before the maximum bending strain $\epsilon_{max}$ is exceeded at the inner fiber of a convolution. Max allowable change in extension $$\Delta\alpha_{max} = \frac{4\pi\epsilon_{max}(r_f - t/2)}{t}$$

angle: (25)

FIG. 46 shows an inner curvature 517 where the maximum bending strain occurs in the bellows material as extension angle 511 changes. In practice, for metals, $\Delta\alpha_{max}$ will be smaller than about 0.5 radians (30 degrees). For such a small extension angle range, the change in wall angle $^2\Delta\beta^*$ can be kept consistently low in the presence of manufacturing errors by setting $\chi 2$ so that the second root extension angle is larger than $\Delta\alpha_{max}$ by 20%. In other words, $^2\Delta\beta^*$ is zero when $\chi = \kappa \Delta\alpha_{max}$ and although $\kappa$ could be unity it should be 1.2 to provide a 20% safety factor. The change in wall angle $^2\Delta\beta^*$ according to equations (7) and (15) is then:

$$^2\Delta\beta^* = \pi - 2\tan^{-1}(\cos(\alpha/2)\tan(\chi_1)) + 2\tan^{-1}(\cos(\alpha/2)\tan(\chi_2))^{-2}\beta 0^*$$ (27)

Since $^2\Delta\beta^* = 0$ when $\chi = 1.2 \Delta\alpha_{max}$, all unknowns in $^2\Delta\beta^*$ except for $\chi^2$ can be eliminated resulting in:

$$0 = 2\pi/n_s - 2\tan^{-1}(\cos(1.2\Delta\alpha_{max}/2)\tan(\pi/n_s + \beta_2)) + 2\tan^{-1}(\cos(1.2\Delta\alpha_{max}/2)\tan(\chi_2))$$

from which $\chi_2$ can be iteratively solved using any numerical algorithm such as Excel "Solver".

With $\chi_1$ and $\chi_2$ determined, a designer can determine the proper tube seam offset 508 (in FIGS. 47 and 48) which should be present when tube 501 is clamped to lower mandrel 520 prior to twist folding. As is shown in FIG. 47, tube seam offset 508 should be chosen so that seam line 518 never crosses a fold vertex such as 519. For a hexagonal bellows with less than 20 convolutions ($n_p = 20$), the tube seam offset 508 can safely be set to P/24. When using a larger number of convolutions, or for polygons other than a hexagon, a seam may inevitably cross at least one vertex, but regardless the best distance can be determined for the specific bellows graphically or with a computational algorithm.

Continuing with the analysis, with $\chi_1$ and $\chi_2$ determined, the following important bellows dimensions can be computed.

Flattened height of one convolution: 
$$f = \frac{P}{n_s(1/\tan(\chi_2) - 1/\tan(\chi_1))}$$ (29)

Outer effective diameter: $D_{effo} = 2(c_{cc} + t)$ (30)

Inner effective diameter: $D_{effi} =$ (31)
$$\frac{P(\cos(\chi_2) + \sin(\chi_2)/\tan(2\pi/n_s) - \sin(\chi_2)/\sin(2\pi/n_s))}{n_s \tan(\pi/n_s)}$$

Figure 48:
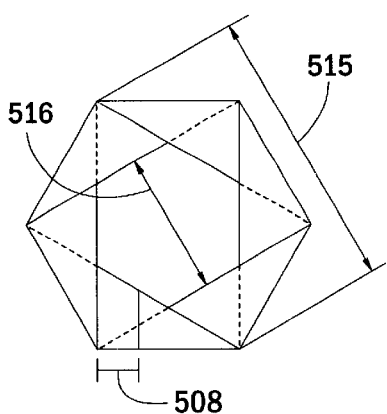
FIG. 48 is a plan view of an example folded metal bellows in accordance with the subject invention.

FIG. 48 shows the effective outer diameter 515 and effective inner diameter 516 of a folded hexagonal bellows.

The following equations show how to compute the minimum functional height, the maximum function height, and the functional stroke of the completed bellows.

Min. functional height of one convolution: $h_{min\,pp} =$ (32)
$$\begin{cases} 2(2r_f + t) & \text{for } 3 \le n_s \le 6 \\ 3(2r_f + t) & \text{for } n_s > 6 \end{cases}$$

Max. function height of one convolution: $h_{maxpp} = h_{minpp} + f \sin(\Delta\alpha_{max}/2)$ (33)

Functional stroke of one convolution:

The total minimum functional height of the bellows $S_{pp} = h_{maxpp} - h_{minpp}$ is the minimum functional height of one convolution times the number of convolutions or $h_{minpp} * n_p$. Similarly, the maximum functional height of the bellows is $h_{maxpp} * n_p$ and the functional stroke of the bellows is $S_{pp} * n_p$. See table 4.

Figure 49:
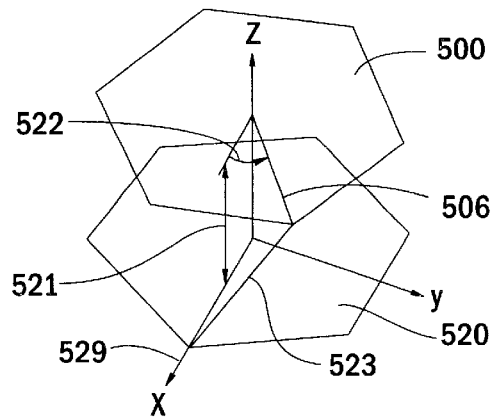
FIGS. 49 is a stick figure representations of the movement of an upper mandrel within a metal tube in accordance with the subject invention.

A bellows convolution is formed by an upward and then a downward motion of a first, (e.g. an upper) mandrel relative to a second, (e.g., a lower) mandrel, which are both fitted snugly inside tube 501, FIG. 45. To illustrate the required mandrel motion, FIG. 49 shows a stick figure of upper mandrel 500 which is at height 521 and at twist angle 522 relative to lower mandrel 520. For the upward motion, tube 501 is clamped to lower mandrel 520, and upper mandrel 500 starts face to face and aligned with lower mandrel 520 inside tube 501 (i.e. height 521 and twist angle 522 both start at zero). Upper mandrel 500 is then moved up and twisted inside tube 501, and while sliding it creases outer diagonal fold lines such as 523 in tube 501. Then tube 501 is clamped to upper mandrel 500, and upper mandrel 500 is moved down and twisted to force both outer and inner fold lines such as 523 and 528 respectively to be formed. Before the required mandrel motions can be presented, the following three quantities must be computed first:

Length of diagnal outer fold line for a convolution:
$$L_1 = \frac{f}{\sin(\chi_1)}$$ (35)

Angle of upper mandrel relative to lower mandrel when upward movement ends:
$$\theta_o = \frac{2\pi f}{P \tan(\chi_1)}$$ (36)

Height of upper mandrel relative to lower mandrel when upward movement ends: (37)
$$h_o = (L_1^2 - 2c_{cc}^2(1 - \cos(\theta_o)))^{1/2}$$

Using these three quantities, the upward motion required for mandrel 500 to crease the outer diagonal folds in one convolution is given by $$h = 0 \text{ to } h_o \quad \theta(h) = (\theta_o/h_o)h$$ (38)

The downward motion of mandrel 500 required to fold one convolution is given by $$h = h_o \text{ to } h_{minpp} \quad \theta(h) = \cos^{-1}\left(\frac{h^2 - L_1^2 + 2c_{cc}^2}{2c_{cc}^2}\right)$$ (39)

To create an additional convolution, coordinate system 529 is shifted up a distance of $h_{minpp}$ (the minimum functional height of a convolution) and mandrel 500 is moved again according to the upward and downward motion equations. For a bellows of the present type to have no tendency to twist when compressed, the twist angle 522 must be reversed after making half the convolutions and an equal number of opposite twisting convolutions must be subsequently formed.

To show a practical example, Table 4 shows the characteristics of three practical bellows that were calculated using the above formulas. In this example, the material used for the bellows tube is a cold rolled stainless steel sheet material for which a maximum allowable strain of $\epsilon_{max} = 0.004$ has been designated.

TABLE 4

|  |  | 5 Sided | 6 Sided | 7 Sided | Equations |
|---|---|---|---|---|---|
| Input Parameters |  |  |  |  |  |
| (t)Wall thickness of tube | in | 0.002 | 0.002 | 0.002 |  |
| ($\epsilon_{max}$)Max. Allowed Strain |  | 0.004 | 0.004 | 0.004 |  |
| ($n_s$)Number of Sides | — | 5 | 6 | 7 |  |
| (P)Mean perimeter of tube | in | 3.200 | 3.200 | 3.200 |  |

TABLE 4-continued

|  |  | 5 Sided | 6 Sided | 7 Sided | Equations |
|---|---|---|---|---|---|
| ($r_f$)Mean fold radius | in | 0.015 | 0.015 | 0.015 |  |
| ($\eta_p$)Number of pleats | — | 8 | 8 | 8 |  |
| Output Parameters |  |  |  |  |  |
| ($r_c$)Mandrel corner radius | in | 0.0140 | 0.0140 | 0.0140 | (21) |
| ($C_{cf}$)Center to flat distance | in | 0.4415 | 0.4623 | 0.4747 | (22) |
| ($C_{cc}$)Center to corner distance | in | 0.5424 | 0.5316 | 0.5253 | (23) |
| ($2\beta^*_0$)Initial wall angle | deg | 108.0 | 120.0 | 128.6 | (24) |
| ($\Delta\alpha_{max}$)Max. Allowed change | deg | 20.2 | 20.2 | 20.2 | (26) |
| ($\chi_1$)First design angle | deg | 27.26 | 30.28 | 32.43 | (25) |
| ($\chi_2$)Second design angle | deg | 63.26 | 60.28 | 58.15 | (28) |
| (f)Flattened height of a pleat | in | 0.4454 | 0.4671 | 0.4800 | (29) |
| ($D_{effo}$)Outer effective DIA | in | 1.09 | 1.07 | 1.05 | (30) |
| ($D_{effi}$)Inner effective DIA | in | 0.49 | 0.53 | 0.56 | (31) |
| ($h_{minpp}$)Min. height, one convolution | in | 0.064 | 0.064 | 0.096 | (32) |
| ($h_{maxpp}$)Max. height, one pleat | in | 0.142 | 0.146 | 0.180 | (33) |
| ($S_{pp}$)Stroke, one pleat | in | 0.078 | 0.082 | 0.084 | (34) |
| ($h_{minpp}*\eta_p$)Min. functional height | in | 0.51 | 0.51 | 0.77 |  |
| ($\eta_{max}*\eta_p$)Max. functional height | in | 1.14 | 1.17 | 1.44 |  |
| ($S_{pp}*\eta_p$)Functional Stroke | in | 0.62 | 0.65 | 0.67 |  |
| Inner DIA/Outer DIA | % | 45.0% | 49.6% | 52.7% |  |
| Max. height/Min. height | — | 2.22 | 2.28 | 1.88 |  |
|  |  |  | Preferred Choice |  |  |

This table shows all parameters calculated for a practical pentagonal, hexagonal, and heptagonal bellows, with all input parameters other than n, set equal and at practical values. The hexagonal bellows is preferred because it has the largest functional Max. height to Min height ratio, while having the second largest inner diameter to outer diameter ratio.

Comparing the preferred hexagonal bellows to other technologies, formed bellows and a welded bellows with a 50% inner diameter to outer diameter ratio would have Max. height to Min. height ratios of about 1.1 and 10, respectively. In the context of existing technologies, the present invention is useful because it can provide performance that is in between a formed and welded bellows, at a competitive cost.

Tables 5 shows the key motion parameters and Table 6 shows h vs. θ values to crease and fold one convolution, computed for the motion of upper mandrel 500 relative to lower mandrel 520.

TABLE 5

|  |  | 6 Sided |
|---|---|---|
| Input Parameters |  |  |
| (t)Wall thickness of tube | in | 0.002 |
| ($\epsilon_{max}$)Max. Allowed Strain | — | 0.004 |
| ($\eta_s$)Number of Sides | — | 6 |
| (P)Mean perimeter of tube | in | 3.200 |
| ($r_f$) Mean fold radius | in | 0.015 |

TABLE 5-continued

|  |  | 6 Sided |
|---|---|---|
| ($\eta_p$)Number of pleats | — | 8 |
| Key motion Parameters |  |  |
| Length of diagonal outer fold line | in | 0.5378 |
| At end of upward motion |  |  |
| Angle of upper mandrel | deg | 29.997 |
| Height of upper mandrel | in | 0.4621 |

TABLE 6

| Motion of Upper Mandrel | | | |
|---|---|---|---|
| Upward Phase | | Downward Phase | |
| h | θ | h | θ |
| 0.0000 | 0.000 | 0.4621 | 29.997 |
| 0.0462 | 3.000 | 0.4223 | 36.509 |
| 0.0924 | 5.999 | 0.3825 | 41.661 |
| 0.1386 | 8.999 | 0.3427 | 45.892 |
| 0.1848 | 11.999 | 0.3029 | 49.417 |
| 0.2310 | 14.999 | 0.2630 | 52.360 |
| 0.2773 | 17.998 | 0.2232 | 54.799 |
| 0.3235 | 20.998 | 0.1834 | 56.783 |
| 0.3697 | 23.998 | 0.1436 | 58.347 |
| 0.4159 | 26.997 | 0.1038 | 59.513 |
| 0.4621 | 29.997 | 0.0640 | 60.295 |

The points in Table 5 or the mandrel motion formulas used to derive them can easily be programmed into a CNC controller to precisely control the mandrel motion required for creasing and folding.

Figure 50A:
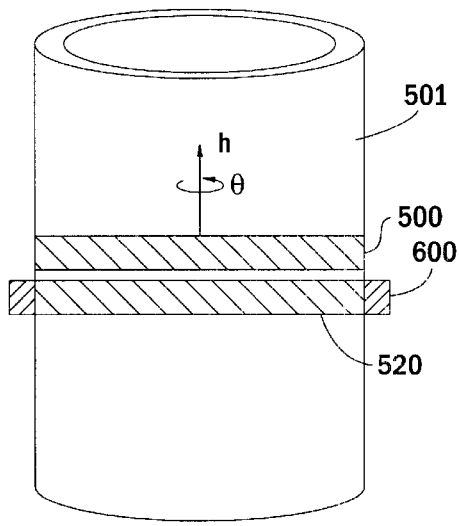
FIGS. 50A–50D are schematic views depicting the primary steps associated with the method of making a folded metal bellows in accordance with the subject invention.

Therefore, as subsequently shown schematically in FIG. 50A–50D, lower mandrel 520, FIG. 50A, having, for example hexagon shape, is placed at the desired location within the round metal tube stock 501. Hexagonal shaped clamp 600 secures tube 501 to lower mandrel 520 and at that location deforms tube 501 into the shape of mandrel 520.

Similarly, upper mandrel 500 is placed in tube 501 proximate lower mandrel 520. From this initial position, upper mandrel 500 is then moved axially in the tube and turned to the position $h_o$ shown in FIG. 50B. As shown in table 5, $h_o$ may be 0.4621" and θ is 29.997°. See also FIG. 49. Thus, mandrel 500 is moved up 0.4621" and turned 29.997°. See equation (38).

Figure 50B:
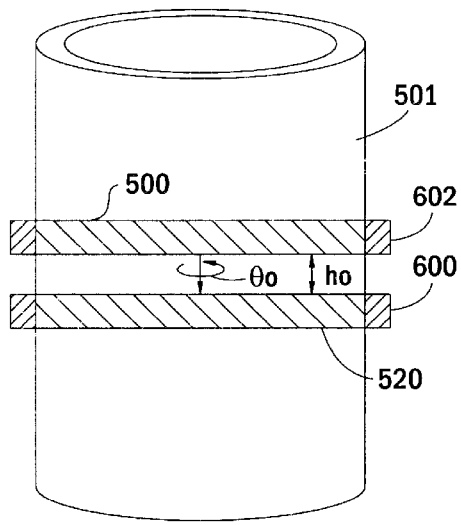
Figure 50C:
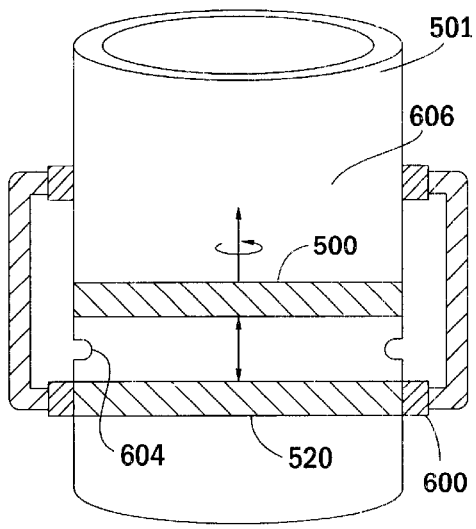

The upper mandrel 500 is then clamped to the tube as shown schematically by clamp 602, FIG. 50B. In FIG. 50C, upper mandrel 500 is then driven back down towards lower mandrel 520 forming first convolution 604, FIG. 50C.

As shown in Table 5, upper mandrel 500 is moved downward from 0.4621" to 0.0640" or 0.3980". 0.0640" is hpp in this example, the minimum functional height of convolution 604. Also, upper mandrel 500 is turned as it was driven downward in the same direction it was formed when it was moved upward in FIGS. 50A and 50B. In this example, mandrel 50 was turned from 29.997° to 60.295° or 30.298°. See Table 5 and equation (39).

To form another convolution, tube portion 606 is fixed with respect to clamp 600, FIG. 50C, i.e. the portion of the tube above convolution 604 and lower mandrel 520 to prevent the expansion of convolution 604 during the formation of subsequent convolutions. Then, upper mandrel 500 is moved axially up again and turned in accordance with equation (38), the coordinates set back to zero for the new initial position of upper mandrel 500.

Figure 50D:
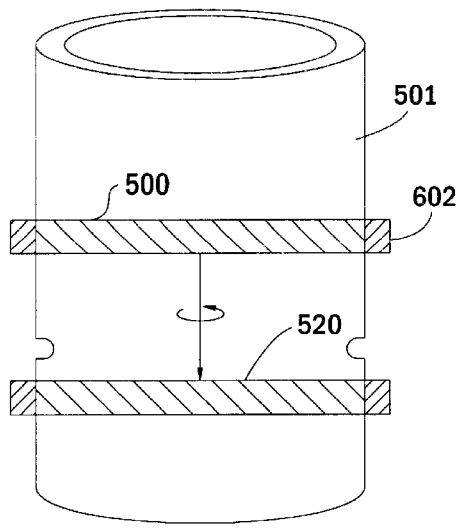

Then, upper mandrel 500 is clamped to tube 501 as shown by clamp 602, FIG. 50D and driven downward in accordance with equation (39).

Additional convolutions up to TPare formed in the same manner except that after ½η$_p$ convolutions are made, the turning direction of upper mandrel 500 may be reversed to eliminate or control the magnitude of twisting within the final bellows upon compression. Typically, mandrels 500 and 520 are hexagonal shaped but may have any number of sides ti preferably where 4≦η≦9.

Broadly, then, the method of this invention includes choosing first and second inversion design angles χ$_1$ and χ$_2$ based a equations (28) and (25) and using the input parameters shown in Table 5 discussed above.

Other input parameters could be chosen (such as the stroke and the minimum and maximum functional heights) and equations (21)–(34)) tailored accordingly. Additionally, a computer program could be designed to run a number of different values of the input parameters given in Table 5 until the desired output parameters are found.

Figure 51:
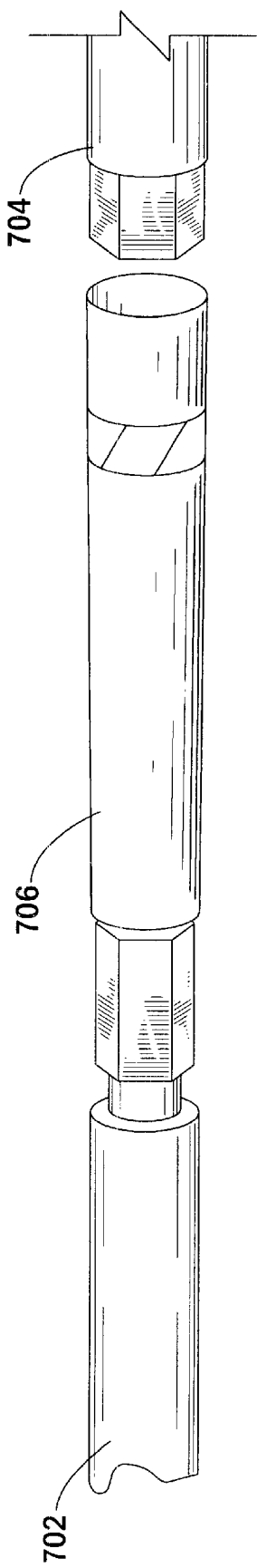
FIG. 51 is a schematic view of a model of an example metal bellows folding apparatus in accordance with the subject invention.
Figure 52:
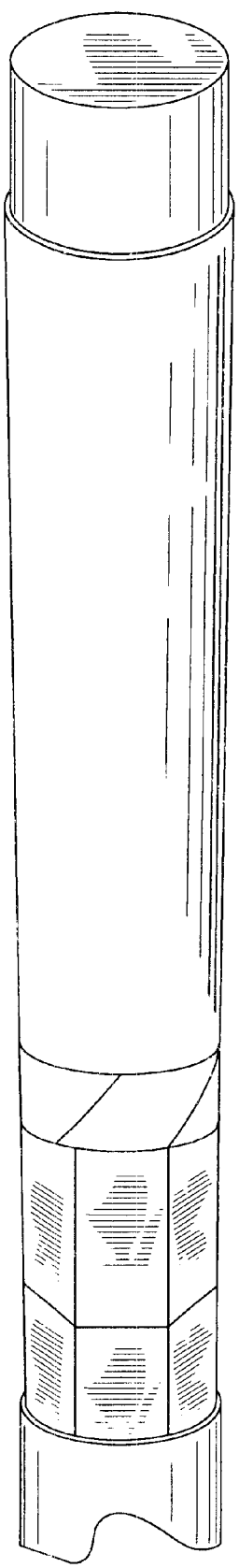
FIG. 52 is a schematic view similar to FIG. 51 except that the forming mandrels are aligned and partially inserted in the metal tube.
Figure 53:
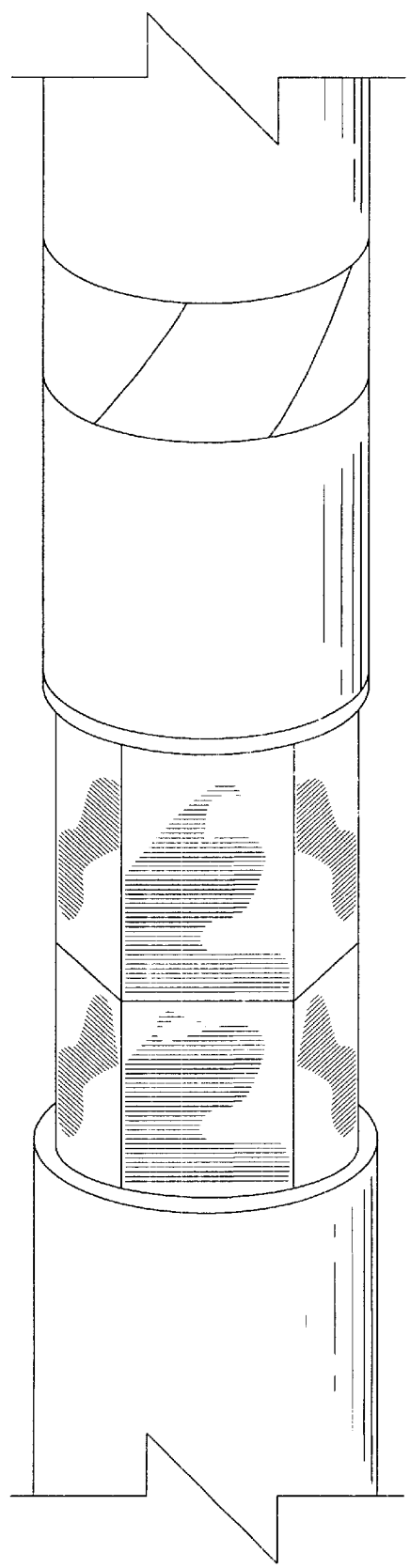
FIG. 53 is a close up schematic view of the mandrels shown in FIG. 52.
Figure 54:
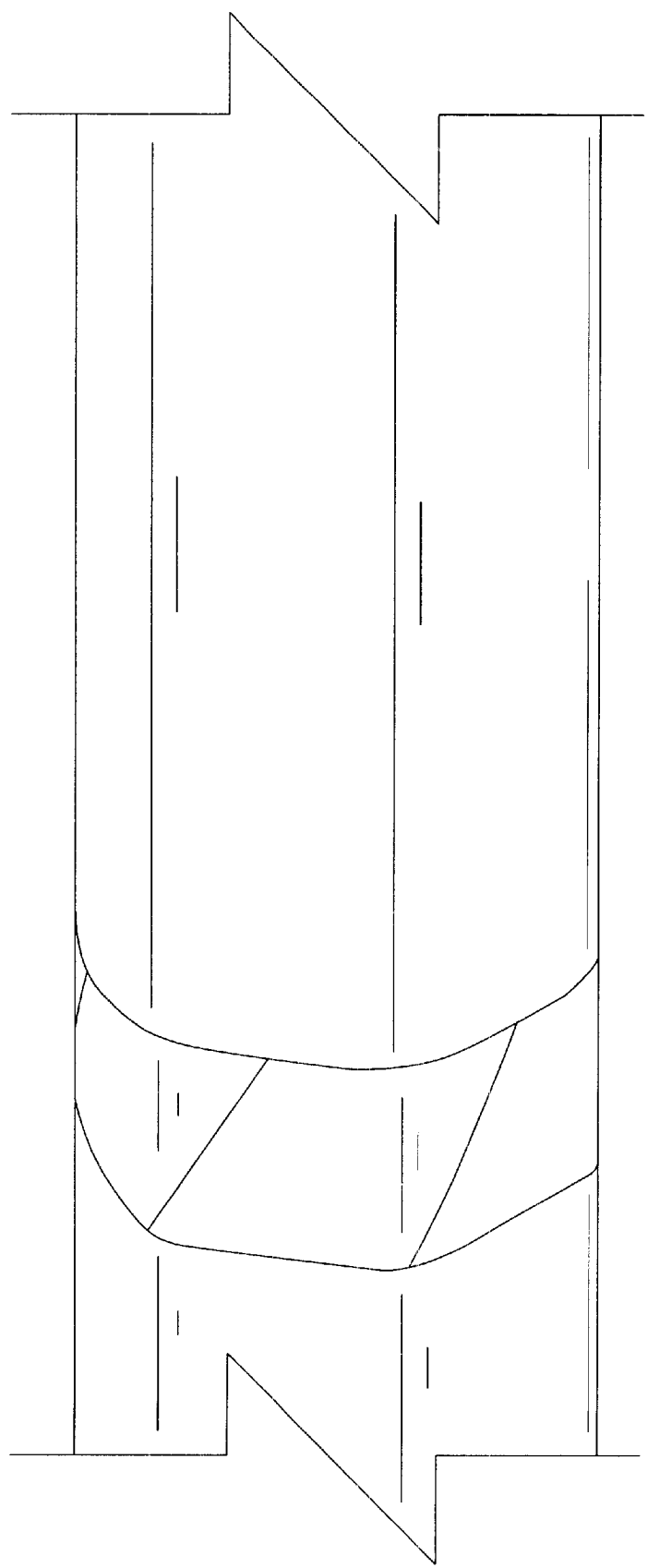
FIG. 54 is a close up view of the tube in place over the two mandrels in accordance with the method of this invention.
Figure 55:
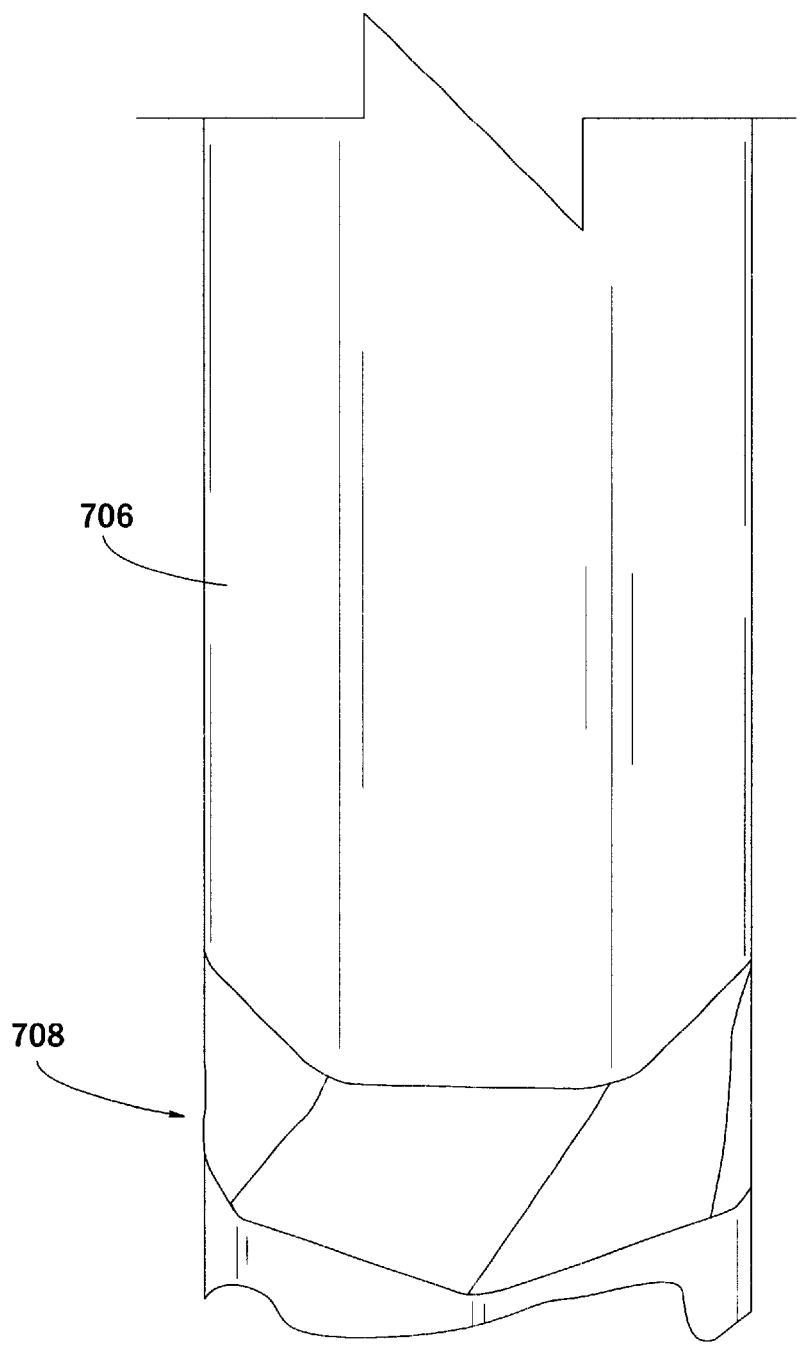
FIG. 55 is a close up view showing the creases which occur as the upper mandrel is moved axially and rotated with respect to the metal tube in accordance with the method of this invention.
Figure 56:
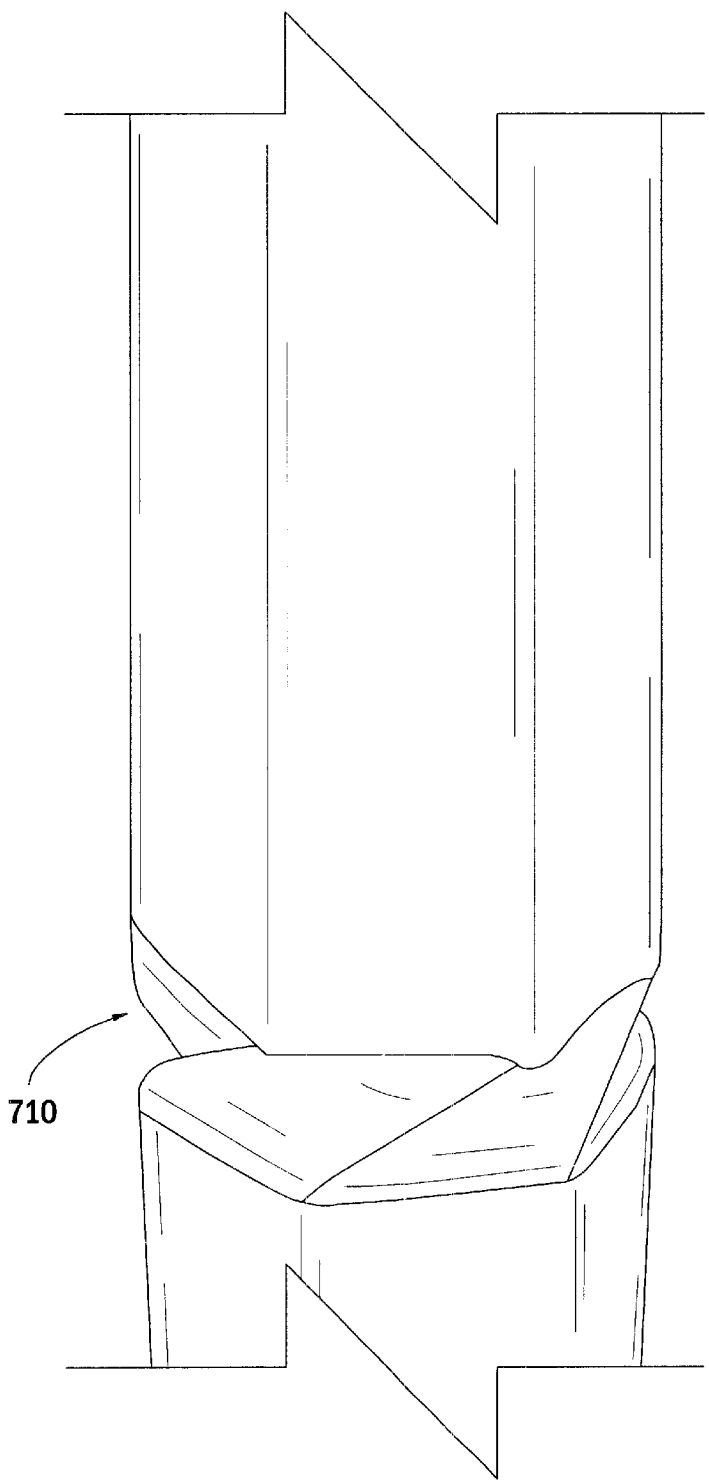
FIG. 56 is a schematic view showing the formation of a convolution when the upper mandrel is fixed with respect to the tube and axially moved and rotated back proximate its original position.
Figure 57:
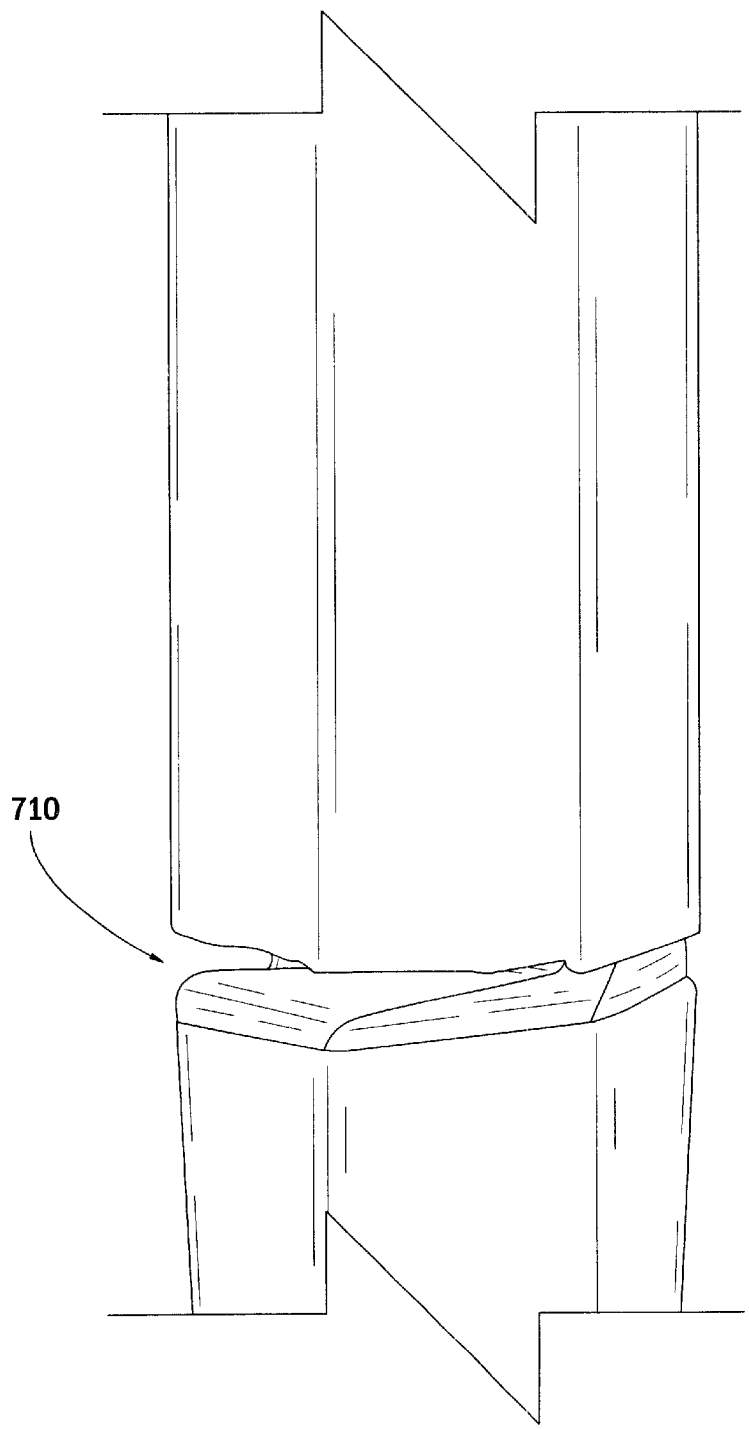
FIG. 57 is a schematic view showing a formed convolution in accordance with the method of this invention.
Figure 58:
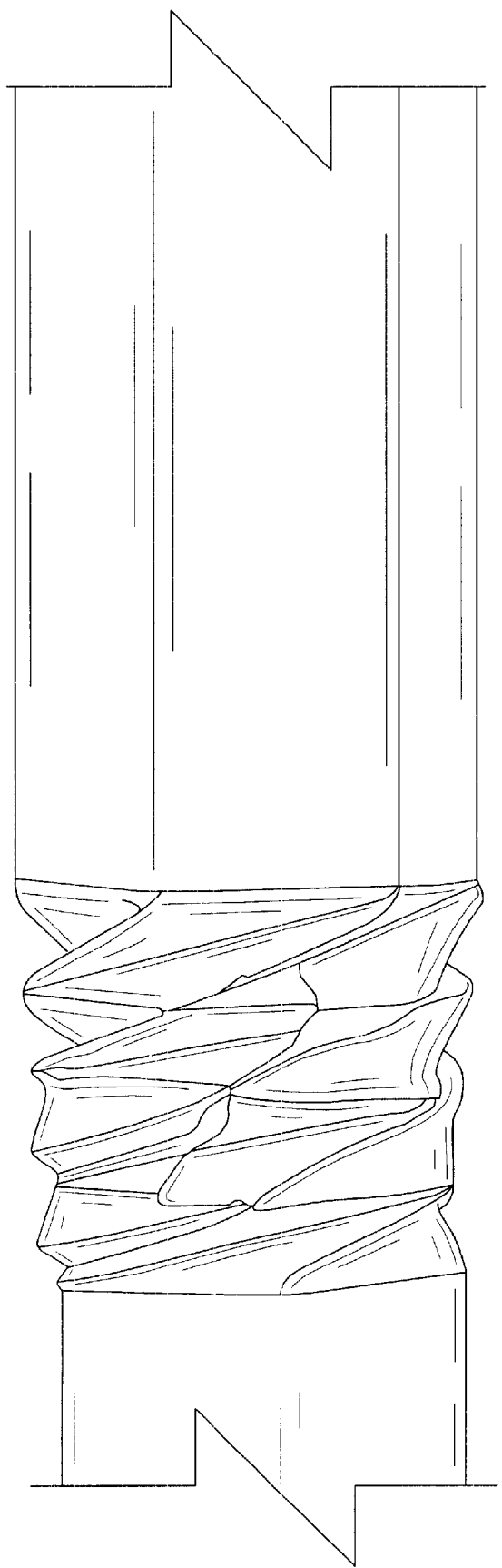
FIG. 58 is a schematic view showing the formation of a number of convolutions in accordance with the subject invention.
Figure 59:
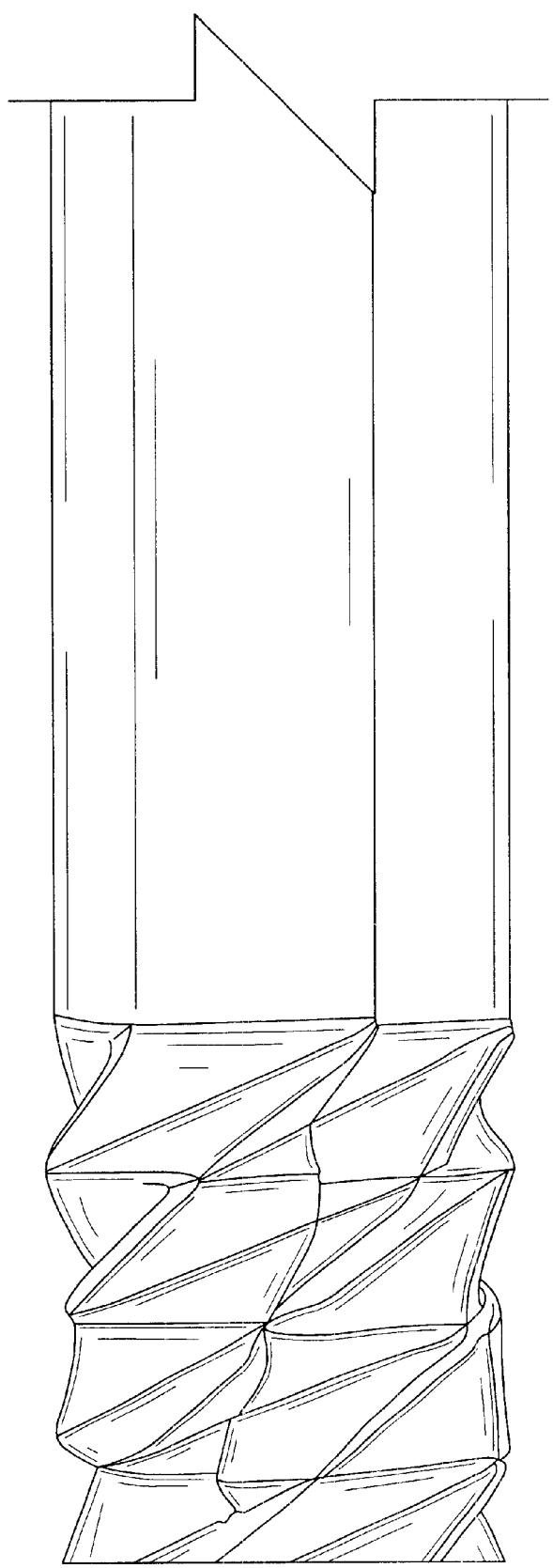
FIG. 59 is a schematic view similar to FIG. 58 showing the metal bellows in a partially extended position.
Figure 60:
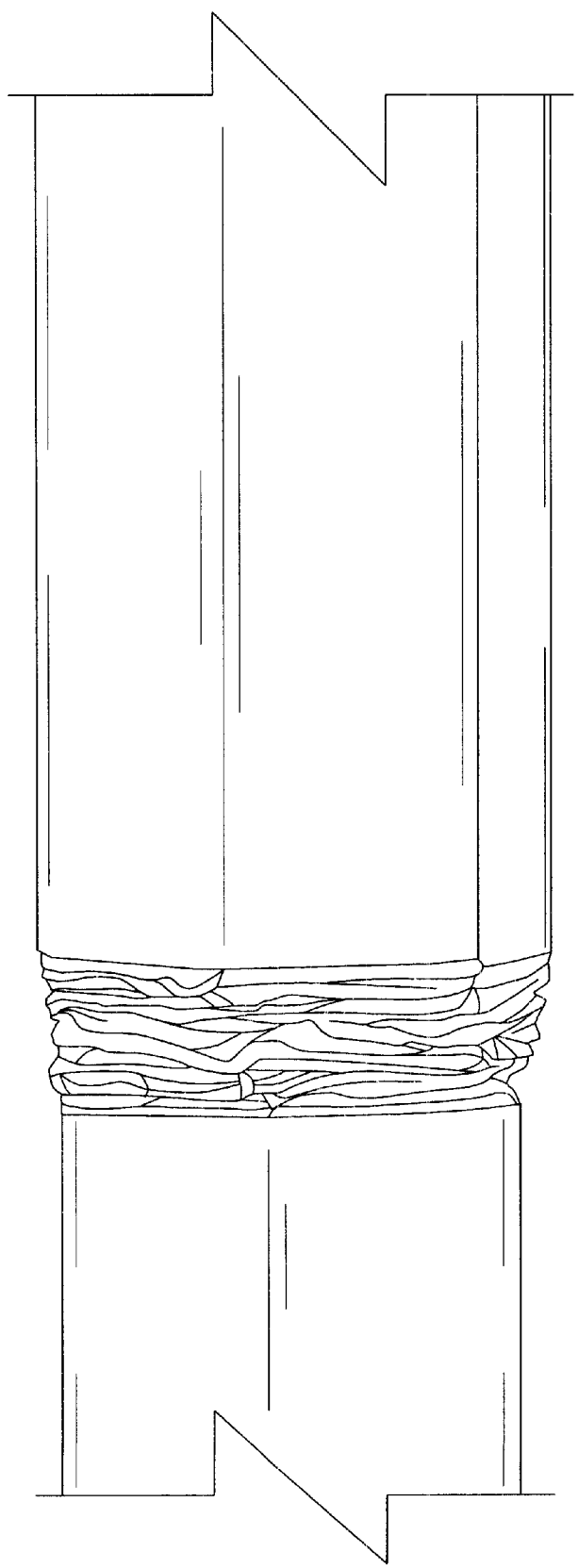
FIG. 60 is a schematic view similar to 58 and 59 showing the bellows in its compressed position.

In another example, the hexagonal ends of upper mandrel 702, FIG. 51 and lower mandrel 704 are inserted into metal tube 706 until they are in an abutting relationship, FIGS. 52, 53, and 54 within the tube at the location where convolutions are to be formed. Upper mandrel 702, FIG. 55 is then moved: axially (upwards) and rotated relative to lower mandrel 704 inside tube 706 forming the fold lines shown at 708. Then, the upper mandrel is fixed to tube 706 and rotated and moved axially back towards lower mandrel 704, FIGS. 56 and 57 forming convolution 710. This process is repeated until the desired number of convolutions are formed as shown in FIGS. 58, 59, and 60.

Figures 61, 62, 63:
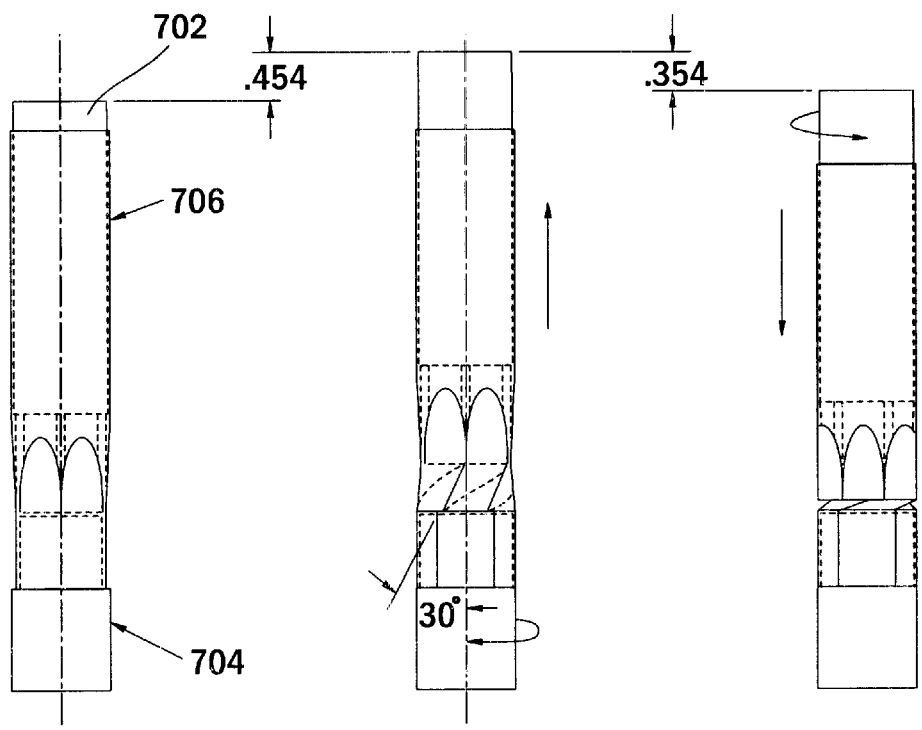
FIG. 61 through 63 are schematic views of an example of forming folded metal bellows in accordance with the subject invention.

In another example, the hexagonal ends of upper mandrel 702, FIG. 61 and lower mandrel 704 are inserted into metal tube 706 until they are in an abutting relationship. Tube 706 is then fixed with respect to lower mandrel 704. Lower mandrel 704 is then rotated 30° clockwise while upper mandrel 702 is raised 0.454 inches without any rotation, FIG. 62. Tube 706 is then fixed with respect to upper mandrel 702 while upper mandrel 706 is lowered 0.354 inches and rotated 30° counterclockwise, FIG. 63 forming convolution 710.

Figure 64:
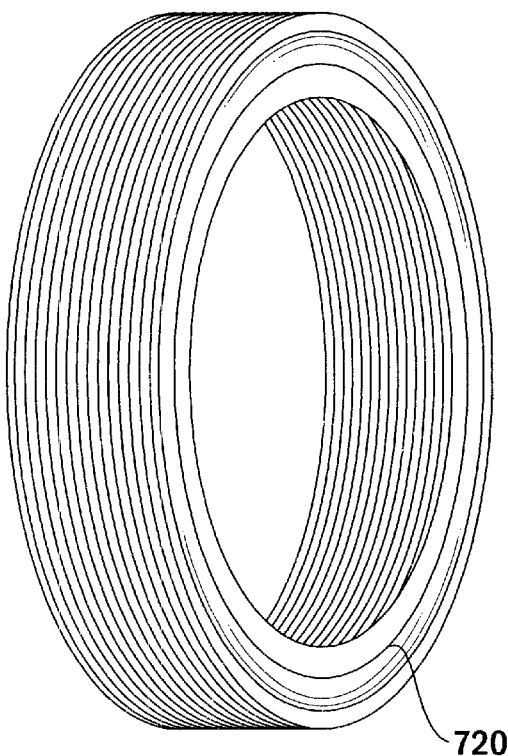
FIG. 64 is a schematic view of a prior art welded metal bellows.
Figure 65:
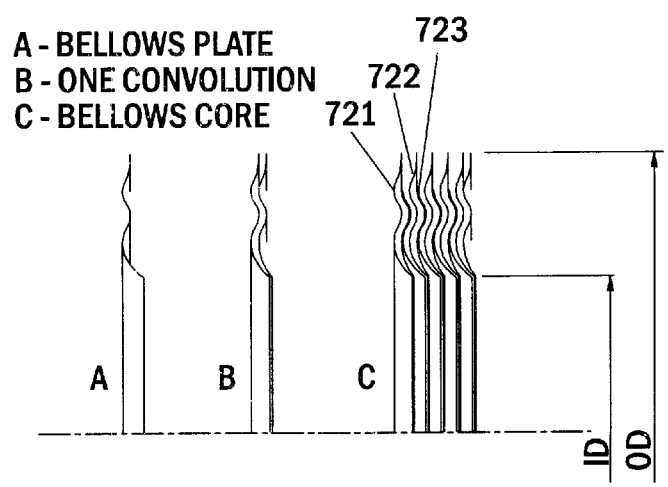
FIG. 65 is a schematic exploded view of the individual rings welded together in order to form the welded metal bellows shown in FIG. 64.
Figure 66:
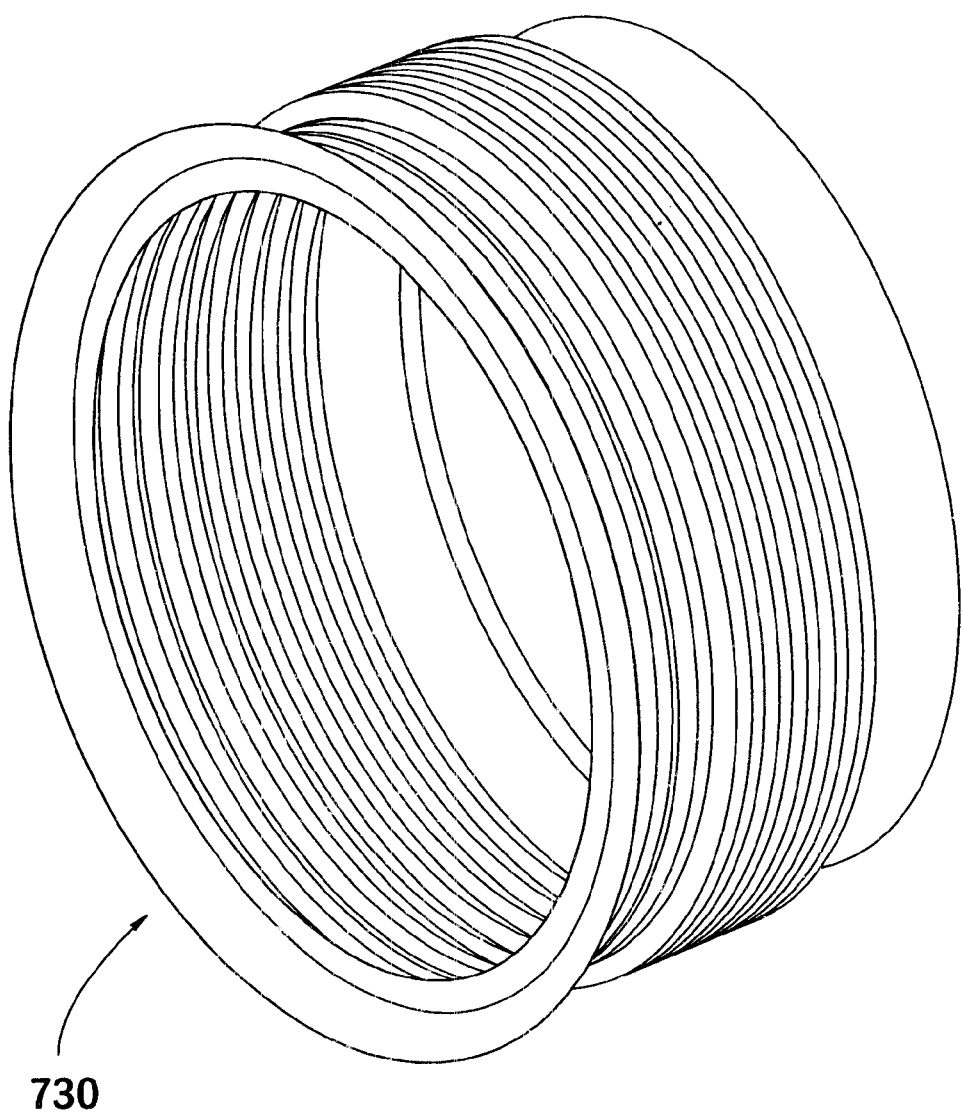
FIG. 66 is a schematic view of a prior art formed metal bellows.

In the prior art, metal bellows were created by welding or forming. Welded bellows 720, FIG. 64 being produced by joining individual metal plates or diaphragms 721, 722, 723, etc. FIG. 65, to each other alternately along the inside and outside edges. Formed bellows are created by a number of methods resulting in the plastic deformation of a tube into the characteristic ripple shape of which 730, FIG. 66 is a typical example.

Although specific features of this invention are shown in some drawings and not others, this is for convenience only as each feature may be combined with any or all of the other features in accordance with the invention.

Other embodiments will occur to those skilled in the art and are within the following claims:

What is claimed is:
1. A method of making a folded metal bellows, the method comprising:
   positioning an n-sided mandrel within a metal tube at an initial position; and forming a convolution by:
   1) axially displacing and rotating the mandrel with respect to and within the tube from the initial position to a second position, and
   2) fixing the mandrel with respect to the tube and driving the mandrel back towards the initial position while rotating the mandrel.

2. The method of claim 1 further including the step of forming additional convolution by positioning the n-sided mandrel at a new initial position within and with respect to the metal tube and repeating steps 1) and 2).

3. The method of claim 2 further including the steps of positioning a second n-sided mandrel within the metal tube such that the convolutions are located between the second n-sided mandrel and the first n-sided mandrel, and fixing a portion of the tube beyond the convolutions with respect to the second n-sided mandrel to prevent movement of convolutions during movement of the first n-sided mandrel with respect to the tube.

4. The method of claim 1 in which 4≦n≦9.

5. The method of claim 1 in which in step 2 the first n-sided mandrel is rotated with respect to the tube in the same direction as in step 1.

6. The method of claim 2 in which in step 2 the mandrel is initially rotated with respect to the tube in the same direction as in step 1 and then reversing the rotation direction after forming a predetermined number convolutions to control twisting of the bellows.

7. A folded metal bellows made by the method of claim 1.

8. A method of making a folded metal bellows out of a tube, the method comprising:
   choosing first and second inversion design angles χ$_1$ and χ$_2$ based on the function:

$$0 = 2\pi/n_s - 2\tan^{-1}(\cos(1.2\,\Delta\alpha_{max}/2)\tan(\pi/n_s + \chi_2)) + 2\tan^{-1}(\cos(1.2\,\Delta\alpha_{max}/2)\tan(\beta_2))$$

where $\Delta\alpha_{max}$ is the maximum allowable change in the extension angle and η$_s$ is the number of sides of the bellows and $$x_1 = \frac{\pi}{n_s} + x_2; \text{ and}$$

folding the metal tube in accordance with said first and second inversion design angles.

9. A folded metal bellows made by the method of claim 8.

10. A method of making a folded metal bellows, the method comprising:
    positioning a first n-sided mandrel within a metal tube at an initial position; and
    forming a convolution by:
    1) axially driving and rotating the mandrel with respect to the tube from the initial position to a second position to form creases in the tube, and
    2) axially driving and rotating the tube to fold the tube along the creases.

11. The method of claim 10 further including the step of positioning a second n-sided mandrel within the tube in an initial abutting relationship with respect to the first n-sided mandrel.

12. The method of claim 11 in which the second n-sided mandrel is fixed with respect to the tube as the first n-sided mandrel is driven and rotated within the tube.

13. The method of claim 11 in which the first n-sided mandrel is axially driven within the tube during step 1) and rotation of the first n-sided mandrel with respect to the tube occurs by rotating the second n-side mandrel.

14. The method of claim 11 in which in step 2) the first n-sided mandrel is fixed with respect to the tube and axially driven and rotated.

15. A method of making a folded metal bellows, the method comprising:

positioning an n-sided mandrel within a metal tube at an initial position; and forming a convolution by:
1) axially displacing and rotating the mandrel with respect to and within the tube from the initial position to a second position;
2) fixing the mandrel with respect to the tube and driving the mandrel back towards the initial position while rotating the mandrel;

forming an additional convolution by positioning the n-sided mandrel at a new position within and with respect to the metal tube and repeating steps 1) and 2); and positioning a second n-sided mandrel within the metal tube such that the convolutions are located between the second n-sided mandrel and the first n-sided mandrel, and fixing a portion of the tube beyond the convolutions with respect to the second n-sided mandrel to prevent movement of convolutions during movement of the first n-sided mandrel with respect to the tube.

16. A method of making a folded metal bellows, the method comprising:

positioning a first n-sided mandrel within a metal tube at an initial position; and forming a convolution by:
1) axially driving and rotating the mandrel with respect to the tube from the initial position to a second position to form creases in the tube, and
2) axially driving and rotating the tube to fold the tube along the creases; and positioning a second n-sided mandrel within the tube in an initial abutting relationship with respect to the first n-sided mandrel.

17. The method of claim 16 in which the second n-sided mandrel is fixed with respect to the tube as the first n-sided mandrel is driven and rotated within the tube.

18. The method of claim 16 in which the first n-sided mandrel is axially driven within the tube during step 1) and rotation of the first n-sided mandrel with respect to the tube occurs by rotating the second n-sided mandrel.

19. The method of claim 16 in which in step 2) the first n-sided mandrel is fixed with respect to the tube and axially driven and rotated.

* * * * *